United States Patent
Johnson et al.

(10) Patent No.: US 10,421,894 B2
(45) Date of Patent: Sep. 24, 2019

(54) METHODS AND MATERIALS FOR CONTROLLED RELEASE OF MATERIALS IN A SUBTERRANEAN RESERVOIR

(71) Applicant: Research Triangle Institute, Research Triangle Park, NC (US)

(72) Inventors: Leah Marie Johnson, Durham, NC (US); Ginger Denison Rothrock, Cary, NC (US); Chasity Antoninette Norton, Roxboro, NC (US); Nicolas Daniel Huffman, Raleigh, NC (US); Jeffrey Brent Mecham, Raleigh, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 0 days.

(21) Appl. No.: 15/634,340

(22) Filed: Jun. 27, 2017

(65) Prior Publication Data
US 2017/0369766 A1    Dec. 28, 2017

Related U.S. Application Data

(60) Provisional application No. 62/354,909, filed on Jun. 27, 2016.

(51) Int. Cl.
| | |
|---|---|
| C09K 8/588 | (2006.01) |
| E21B 33/138 | (2006.01) |
| E21B 43/20 | (2006.01) |
| C09K 8/508 | (2006.01) |
| C09K 8/512 | (2006.01) |
| C09K 8/516 | (2006.01) |

(52) U.S. Cl.
CPC ............ *C09K 8/588* (2013.01); *C09K 8/508* (2013.01); *C09K 8/512* (2013.01); *C09K 8/516* (2013.01); *E21B 33/138* (2013.01); *E21B 43/20* (2013.01); *C09K 2208/10* (2013.01)

(58) Field of Classification Search
None
See application file for complete search history.

(56) References Cited

U.S. PATENT DOCUMENTS

| | | | |
|---|---|---|---|
| 4,770,796 A | 9/1988 | Jacobs | |
| 6,387,986 B1 * | 5/2002 | Moradi-Araghi | C09K 8/516 166/300 |
| 7,595,281 B2 | 9/2009 | McDaniel et al. | |
| 8,141,637 B2 | 3/2012 | Barmatov et al. | |
| 2010/0065271 A1 | 3/2010 | McCrary et al. | |
| 2010/0314118 A1 | 12/2010 | Quintero et al. | |
| 2012/0004148 A1 | 1/2012 | Ogle et al. | |

FOREIGN PATENT DOCUMENTS

| | | |
|---|---|---|
| WO | WO 2011/048459 | 4/2011 |
| WO | WO 2012/090158 | 7/2012 |
| WO | WO 2012/116230 | 8/2012 |

OTHER PUBLICATIONS

Cocuzza et al., "Current and Future Nanotech Applications in the Oil Industry," *American Journal of Applied Sciences*, 2012, pp. 784-793, vol. 9, No. 6.
Tiantian et al., "Engineered Nanoparticles as Harsh-Condition Emulsion and Foam Stabilizers and as Novel Sensors," *Offshore Technology Conference*, May 2-5, 2011, p. 6. Par. 2.

* cited by examiner

*Primary Examiner* — Ana L. Woodward
(74) *Attorney, Agent, or Firm* — Womble Bond Dickinson (US) LLP

(57) ABSTRACT

The present disclosure relates to delivery and release systems, such as core-shell particles. An exemplary composition according to the disclosure can include a degradable polymeric shell surrounding a core that includes a crosslinker, which can encompass a metal, such as chromium. The core-shell particles can be provided with a gel-forming polymer, such as a polyacrylamide, into a subterranean reservoir having conditions such that the shell of the core-shell polymer degrades, and the so-released metal is effective to at least partially crosslink the gel-forming polymer to form a gel. The so-formed gel can be effective to control water flow through the subterranean reservoir, such as in relation to a waterflood of the reservoir.

13 Claims, 20 Drawing Sheets

Neat polyurea nanocapsules:
V-50 shell, Cr3+ core *(400nm)*

Neat polyurea nanocapsules:
V-50 shell, Cr3+ core *(200nm)*

Neat polyurethane nanocapsules:
VA-086 shell, Cr3+ core *(200nm)*

Neat polyurethane nanocapsules:
VA-086 shell, Cr3+ core *(600nm)*

METHODS AND MATERIALS FOR CONTROLLED RELEASE OF MATERIALS IN A SUBTERRANEAN RESERVOIR

FIELD OF THE DISCLOSURE

The present disclosure relates to delivery and release compositions, systems, and methods of use thereof. In particular, the present disclosure relates to carrier elements adapted to contain a further material and release the further material in response to a specified trigger.

SUMMARY

Embodiments of the present disclosure provide systems and methods whereby materials may be provided to a subterranean reservoir for controlled release of elements that initiate formation of gels that can be effective to control water flow in areas of the reservoir. The systems and methods can be utilized particularly in relation to waterflooding, a technique that has been shown to be valuable for improving recovery in a subterranean reservoir, such as enhanced oil recovery ("EOR") methods or the like. Waterflooding techniques are useful for maintaining high reservoir pressures while physically displacing oil. The advantages of this approach, including efficiency of displacement, widespread availability of water, and ease of injection, makes waterflooding the most extensively used post-primary method worldwide. Embodiments of the presently disclosed systems and methods can be utilized in controlling unnecessary water production associated with a waterflood treatment, and can thus reduce or eliminate the substantial cost of surface water treatment facilities, treatment and disposal, as well as other measures that may otherwise be required to ensure environmental safety. Embodiments of the present systems and methods likewise can overcome the problem of poor sweep efficiency of the drive fluid, which otherwise renders significant quantities of unrecoverable oil. In one or more embodiments, the present disclosure provides for the use of crosslinked gels for placement in a subterranean reservoir to control local flow of water. Such crosslinked gels may be utilized alone or in combination with other methods for water control, such as squeeze cementing, mechanical isolation, and emulsion treatments. In some embodiments, crosslinked organic polymer gel systems are used and can incorporate the use of various polymers, such as polyacrylamide ("PAM"), partially hydrolyzed polyacrylamide ("HPAM" or polyacrylamide-co-acrylic acid), polyvinyl alcohol ("PVA"), sulfonated PAM, and biopolymers. Depending upon the polymer used, organic or inorganic crosslinkers can be mixed with the polymer to initiate gel formation through crosslinking of the polymer functional groups. In certain embodiments, PAM or HPAM may be crosslinked with chromium, particularly utilizing chromium compounds that are sources of $Cr^{+3}$ ions.

Optimal performance of polymer gels used in mainstream techniques for waterflooding is highly dependent upon timing, placement, and location of chemicals within the oil well. Embodiments of the present disclosure thus provides particle delivery systems that encapsulate relevant oilfield agents (such as crosslinking agents for waterflood applications) and thus enables a tailored, controlled release mechanism to overcome certain challenges associated with reaching deep into high permeability zones in a waterflood reservoir. For example, core-shell systems configured in accordance with embodiments of the present disclosure can regulate the release of oilfield chemistries, both temporally and spatially, to prevent rapid, undesired reactions near a wellbore. The capacity to shield the crosslinking material from reservoir constituents and the injected polymer for a defined time is useful to improve the placement and effectiveness of the crosslinked polymers that ultimately can provide control of water flow within areas of the subterranean reservoir.

The combination of PAM or HPAM with chromium ($Cr^{3+}$) results in a physically crosslinked gel because of complexes formed between the metal and the carboxylic acid groups on the PAM or HPAM. Such combination typically results in a rapid crosslinking reaction at elevated temperatures, and this can preclude deep placement of the gel within a subterranean reservoir. In embodiments of the present disclosure, core-shell particles can be utilized wherein a chemical component (e.g., a crosslinker, such as chromium) is encapsulated within the core of the particle. The core-shell capsules serve as a transport system for controlled delivery of conformance control agents to block highly permeable channels. During transport, the encapsulated constituent is isolated from the reservoir for a designated timeframe to prevent premature, undesired reactions prior to the targeted placement for water shutoff. The capacity to shield the crosslinking material from reservoir constituents and injected polymer for a defined time improves the placement and effectiveness of crosslinked polymer systems that are used for control of water flow within the subterranean reservoir. The core-shell particles remain intact until the desired release time to react with the polymer and form the crosslinked gel. The gel system may thus be delivered to targeted thief zones deep within a reservoir (i.e., formations though which the well pass and into which circulating fluids can be lost).

An exemplary core-shell particle 1 according to embodiments of the present disclosure is shown in FIG. 1, where a shell 3 surrounds a core 5. The core 5 includes a protected material, such as a $Cr^{+3}$ crosslinker, and the shell 3 includes a material that is configured to degrade or otherwise release the core material under only defined conditions. Various polymeric materials in particular may be used in the shell 3. The crosslinker in the core 5 is thus protected by the shell 3 so that combination with a gel-forming polymer (e.g., PAM or HPAM) does not result in crosslinking of the gel-forming polymer until the shell 3 is compromised and the crosslinker is released from the core 5.

Results show the capacity to encapsulate $Cr^{3+}$ acetate into sub-micron nanocapsules, typically with particle diameters measuring between 200 nm to 500 nm, depending on the formulation. Laboratory studies suggest that release profiles of cargo or core material are dictated by the properties of the shell material, such as wall thickness and polymer shell type, enabling a controlled delay of $Cr^{3+}$ delivery and the resulting polymeric gelation. Furthermore, the particle shell systems have shown tolerance to simulated reservoir conditions, including high temperatures, high pressures, and concentrated salinity.

In one or more embodiments, the present disclosure can relate to a controlled-release delivery particle including a core including a metal; and a degradable polymeric shell surrounding the core.

In one or more embodiments, the present disclosure can relate to a gelation system including a gel-forming polymer configured for crosslinking by a metal crosslinker; and a controlled-release delivery particle as described herein.

In one or more embodiments, the present disclosure can relate to a method for controlling water flow through a subterranean reservoir, the method including delivering a gelation system as described herein to a portion of the subterranean reservoir. The subterranean reservoir can exhibit conditions such that the metal is released from the core of the controlled-release delivery particle via degradation of the polymeric shell, and the released metal crosslinks the gel-forming polymer to form a gel that at least partially prevents flow of the water through the portion of the subterranean reservoir where the so-formed gel is located.

In embodiments of the present disclosure, core-shell particles and gelation systems as described herein can be delivered to a subterranean reservoir for a variety of treatments, such as for controlling water flow in the reservoir in relation to a waterflooding treatment. Core-shell particles can be combined with a gel-forming polymer and the mixture can be delivered to the subterranean reservoir. The gel-forming polymer does not crosslink in the presence of the intact core-shell particles. As the shell of the core-shell particle degrades, however, the $Cr^{+3}$ is released and the released $Cr^{+3}$ encounters and crosslinks the gel-forming polymer to form a gel that is effective to reduce or eliminate water flow in portions of the subterranean reservoir in which the gel is present. In the absence of the core-shell nanoparticles and the gelation system, water presented through the injection well migrates through the subterranean reservoir to the production well. When a gelation system and core-shell particles as described herein are used, however, water flow is effectively prevented through the portion of the subterranean reservoir in which the gel has been formed using the gelation system and the core-shell particles.

In certain embodiments, the present disclosure relates to a gelation system comprising: a gel-forming polymer configured for crosslinking with a crosslinker; and a controlled-release delivery particle comprising a degradable polymeric shell surrounding a core comprising the crosslinker. In one or more further embodiments, the gelation system can be characterized in relation to one or more of the following statements that can be combined in any number or order.

The gel-forming polymer is selected from the group consisting of polyacrylamides, partially hydrolyzed polyacrylamides, polyvinyl alcohols, biopolymers, and combinations thereof.

The gel-forming polymer comprises a polyacrylamide-co-acrylic acid.

The gel-forming polymer is in the form of a hydrated solution.

The hydrated solution, in a non-crosslinked form, has a viscosity that is greater than the viscosity of water but is less than 50 cP at a temperature of about 25° C.

The gel-forming polymer has a weight average molecular weight of about 50,000 Da to about 2,000,000 Da.

The crosslinker is source of a metal ion.

The metal ion is selected from the group consisting of Cr(III), Cr(IV), Ti(IV), Al(III), Zr(IV), and combinations thereof.

The crosslinker is selected from the group consisting of chromium propionate, chromium acetate, chromium chloride, or combinations thereof.

The degradable polymeric shell comprises a polymer selected from the group consisting of polyureas, polyurethanes, and combinations thereof.

The degradable polymeric shell is configured for one or more of thermal degradation, oxidative degradation, and chemical degradation for release of the crosslinker from the core.

The degradable polymeric shell comprises one or more of polymers with hydrolytically cleavable groups that degrade with time, polymers with hydrolytically degradable groups that degrade in aqueous media, polymers with azo cleavable groups, and polymers with thermally degradable azo groups.

The degradable polymeric shell is configured to release the crosslinker from the core in response to a change in one or more of pH, temperature, pressure, salinity, shear, water content, oil content, and combinations thereof.

The controlled release delivery particle has an average size of about 50 nm to about 900 nm.

The core further comprises one or more additional agents selected from the group consisting of wettability modifiers, anti-scale agents, surfactants, catalysts, blocking agents, sensors, and combinations thereof.

The gelation system further comprises a different controlled-release delivery particle comprising a degradable polymeric shell surrounding a core comprising one or more agents selected from the group consisting of wettability modifiers, anti-scale agents, surfactants, catalysts, blocking agents, sensors, and combinations thereof.

BRIEF DESCRIPTION OF THE FIGURES

Reference will now be made to the accompanying drawings, which are not necessarily drawn to scale, and wherein.

DETAILED DESCRIPTION

Figure 1:
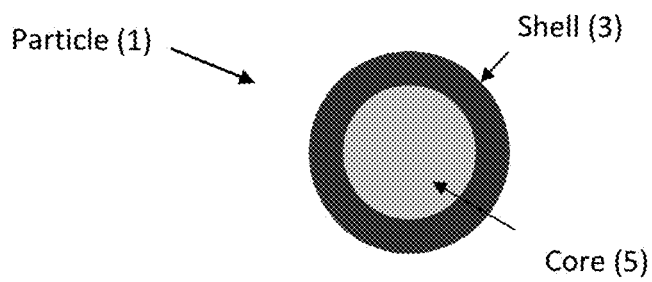
FIG. 1 is a cross-sectional view of a core-shell particle according to embodiments of the present disclosure.

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a," "an," and "the" include plural referents unless the context clearly dictates otherwise.

Embodiments of the present disclosure provide triggered release particles that can be used in a variety of environments and under a variety of conditions. The particles include an outer shell defining an interior core. The core can include one or more materials that are releasable upon a change to the outer shell wherein at least a portion of the shell is degraded or otherwise compromised. The shell material can be varied in structure, composition, and method of making to provide for controlled release of the core material(s) only under defined conditions. In one or more embodiments, the shell may be characterized as being a wall, and the shell may be described as encapsulating or surrounding one or more materials within the core formed by the shell or wall.

The core-shell particles can be combined with a further composition to provide a gel system whereby a gel-forming polymer is crosslinked via a core material in the core-shell particles upon release of the core material from the shell under the defined conditions. As such, a crosslinker carried in the core of the core-shell particles is only released upon degradation or other physical or chemical change of the shell. Conditions suitable to cause such release may particularly be encountered in subterranean reservoirs for hydrocarbon deposits (e.g., oil). Core-shell particles according to embodiments of the present disclosure can be submicron in size, such as having an average particle size of about 50 nm to about 900 nm, about 100 nm to about 800 nm, or about 150 nm to about 750 nm.

A variety of materials may be included in the core of the core-shell particles. In some embodiments, a core material may be a crosslinker—i.e., a material suitable to react with a polymer and cause bonding between polymer chains and/or functional groups on polymer chains. The crosslinker may be suitable for forming ionic bonding and/or covalent bonding. Likewise, the crosslinker may be suitable for forming a coordination complex or metal complex with the polymer chains. In some embodiments, the core material can be a source of a polyvalent metal ion that is suitable to crosslink with a functional group on a polymer, such as carboxylate groups on PAM and/or HPAM. Non-limiting examples of polyvalent metal ions within the core of the particle include Cr(III), Cr(IV), Ti(IV), Al(III), and Zr(IV). The metal ions may be provided as metal compounds and/or solutions of metal compounds. In embodiments, the source for a polyvalent metal ion may be chromium propionate. In other embodiments, a polyvalent metal ion source can be chromium acetate. In yet other embodiments, the polyvalent metal ion source can be chromium chloride.

In some embodiments, the core may include materials other than crosslinkers. The different materials may be provided in core-shell particles that can be combined with core-shell particles that include a crosslinker in the core. The different materials alternatively may be provided with the crosslinker in the cores of the same particles (i.e., a core including a crosslinker and one or more further materials). Non-limiting examples of further materials include wettability modifiers, anti-scale agents, surfactants, catalysts, and blocking agents. Quantum dots are a non-limiting example of a sensor that may be used.

The material of the shell of the particle can be a polymer or a polymer composite. In some embodiments, the polymer includes a polyurea or a polyurethane. The material utilized in forming the shell can, in some embodiments, be based upon a process by which the polymer shell is formed.

In one or more embodiments, a core-shell particle can be prepared by mini-emulsion coupled with interfacial polymerization. Mini-emulsion polymerization serves as a robust methodology for preparing core-shell nanocapsules in a robust and scalable manner. The mini-emulsion is a dual-phase system wherein droplets (i.e., dispersed phase) form within the surrounding solutions (i.e., the continuous phase) after the application of high shear forces, such as homogenization or sonication. With an appropriate surfactant package and monomer formulation, the mini-emulsion can be stable and can readily encapsulate a variety of cargo. In particular, inverse mini-emulsion with interfacial polymerization is a useful approach for encapsulating aqueous solutions and has shown utility in biological-based applications. In this approach, a water-soluble monomer that is present as aqueous droplets can combine with a cargo material for placement in the core (e.g., a $Cr^{+3}$ crosslinker) and polymerize interfacially with a hydrophobic monomer that is present within the continuous phase. Ultimately, the resultant polymer engulfs the core, thereby forming a core-shell particle.

The interfacial polymerization can occur by step growth polymerization. Non-limiting examples of step growth polymerization for preparing particles useful according to embodiments of the present disclosure include amidation, esterification, formation of urethanes, formation of epoxies, formation of polysiloxanes, formation of polyureas, formation of phenol formaldehyde resins, and formation of polysulfides. In a non-limiting example, the particle is prepared via step growth polymerization using one or more monomers that contain two or more functional groups per monomer. In another non-limiting example, the shell of the particle is prepared via step growth polymerization using a monomer with two primary amine functional groups and a monomer with two isocyanate functional groups. In a further non-limiting example, the shell of the particle is prepared via step growth polymerization using a monomer with two hydroxyl functional groups and a monomer with two diisocyanate functional groups.

In some embodiments, the particles can be prepared by an interfacial reaction between two immiscible monomers at the interface between the core and a surrounding solution. Non-limiting examples of monomers used in such interfacial reactions include compounds that contain one or more nucleophile groups, including monomers with one or more hydroxyl functional groups, monomers with one or more mercapto groups, and monomers with one or more primary amine groups. Other non-limiting examples of monomers used in the interfacial reactions include compounds that contain one or more isocyanate groups.

In further embodiments, the particles can be prepared using chain growth polymerization. Non-limiting examples of polymers that can be formed via this technique include polystyrene, polyacrylonitrile and polvinylidene chloride. The core-shell particles can be configured such that a material used in forming the shell can degrade, decompose, undergo scission, or otherwise break down such that the core material may be released from the particle. Such configuration can include the presence of chemical groups that lead to such result under conditions of a subterranean reservoir. Non-limiting examples of conditions that can affect the shell to bring about release of the core include pH, temperature, pressure, salinity, shear, water content, oil content, and the like.

The polymer or composite shell can be configured to remain intact for an extended time period at conditions of the subterranean reservoir where the particles may be placed and then subsequently release the cargo after the time period. The delayed release provided by the core-shell particles can provide for release of the core material at a further distance from the wellbore through which it is injected, particularly in comparison with direct injection. In one or more embodiments, the core-shell particles can be configured to remain substantially intact under the conditions of the subterranean reservoir for a time of at least hours, at least 48 hours, at least 1 week, at least 2 weeks, at least 3 weeks, or at least four weeks, such time periods being understood to include a terminal time upon which at least a portion of the core-shell particles will release the core material. Such terminal time can be, for example, a maximum of 5 weeks, 6 weeks, or 8 weeks. In some embodiments, at least 50%, at least 75%, or at least 90% by weight of the core-shell particles will sufficiently open to release the core material within a time of about 24 hours to about 6 weeks, about 24 hours to about 1 week, about 24 hours to about 3 days, about 48 hours to about 2 weeks, about 48 hours to about 1 week, about 1 week to about 6 weeks, or about 1 week to about 3 weeks. The core-shell particles may also be configured to provide controlled release of a defined amount of the core material within further time periods.

The core-shell particles can be configured for release of the core material at a defined temperature range, such as a temperature of at least 30° C., at least 40° C., or at least 50° C. Non-limiting examples of temperature ranges under which release occurs include about 30° C. to about 90° C., about 30° C. to about 75° C., about 40° C. to about 60° C., or about 45° C. to about 55° C. The particles may be configured so that release occurs upon reaching the noted temperature or so that release occurs within a time period as noted above, said time period beginning upon the particles being subjected to the noted temperature range.

As further examples, core-shell particles according to embodiments of the present disclosure may be configured to be substantially stable when subjected to relatively low salinity conditions but be configured to undergo a change as described herein when subject to increased salinity conditions in a subterranean reservoir. Such condition may be a salinity of about 10,000 ppm or greater, about 20,000 ppm or greater, or about 35,000 ppm or greater. In some embodiments, such condition may be a salinity that is approximately equal to the salinity of seawater (+/−5,000 ppm). The particles may be configured so that release occurs upon reaching the noted salinity condition or so that release occurs within a time period as noted above, said time period beginning upon the particles being subjected to the noted salinity range.

The core-shell particles can be configured for use in a subterranean reservoir having defined conditions, such as permeability and/or formation type. For example, the particles may be configured for use in a reservoir with an average permeability of about 2 Darcy to about 10 Darcy, about 3 Darcy to about 8 Darcy, or about 4 Darcy to about 6 Darcy. In some embodiments, the particles are suitable for use in a sandstone reservoir (although the particles are suitable for use in other formation types in other embodiments).

The polymer shell can tolerate harsh environments for a designated timeframe (as noted above) prior to releasing the cargo. After the designated timeframe, the core material can be released from the shell. In one or more embodiments, the core material is released by degradation of the shell. Non-limiting examples of shell degradation include thermal degradation, oxidative degradation, chemical degradation, and combinations thereof. Inclusion of chemical functionalities within the shell material allow for controlled degradation of the particle to release a core material in the designated timescale. As a non-limiting example, the shell material can include polymers with hydrolytically cleavable groups that degrade with time (e.g., as polyesters and polyurethanes). As a further non-limiting example, the shell material can include polymers with azo cleavable groups. As yet a further non-limiting example, the hydrolytically cleavable group can reside in the polymer main chain structure resulting in chain scission after hydrolysis. As another non-limiting example, the shell can contain azo groups that thermally degrade. Suitable azo-containing monomers can include 2,2'-Azobis(2-methylpropionamidine)dihydrochloride (commercially available under the name V-50), 2,2'-Azobis[2-methyl-N-(2-hydroxyethyl)propionamide] (commercially available under the name VA-086), 2,2'-Azobis[2-(2-imidazolin-2-yl)propane]dihydrochloride (commercially available under the name VA-044), 2,2'-Azobis[2-(2-imidazolin-2-yl)propane] (commercially available under the name VA-061), 4,4'-Azobis(4-cyanovaleric acid) (commercially available under the name V-501) and combinations thereof. As still another non-limiting example, the shell of the core-shell particle can include hydrolytically degradable groups that degrade in aqueous media. Non-limiting examples of monomers used to prepare shells with degradable hydrolytically degradable groups includes glycerol, pentaerythritol tetrakis(3-mercaptopropionate), ethylene glycol bisthioglycolate, glycolic acid, lactic acid, and combinations thereof. In certain examples, the core-shell particle degrades from the inside-out, wherein the core material degrades the shell to release the cargo. In other examples, the core-shell particle degrades from the outside-in, wherein the constituents in the reservoir degrade the shell. Further materials suitable for use in forming core-shell particles are described in PCT Pub. No. WO 2015/023648, the disclosure of which is incorporated herein by reference.

In one or more embodiments, the core-shell particles may be combined with a gel-forming polymer so as to form a crosslinked gel under time-controlled conditions. For example, the core-shell particles can include a crosslinker material (e.g., chromium) in the cores surrounded by a shell material that is stable under conditions of manufacturing, storage, and shipping but which can degrade or otherwise release the core material under different conditions, as noted herein. Said core-shell particles thus can be combined with the gel-forming polymer, the combination subjected to conditions whereby the shell of the particles is degradable or otherwise releases the core material, and the released crosslinker from the core can react with the gel-forming polymer to form crosslinks and thus the gel. In exemplary embodiments, a gel-forming polymer, such as PAM or HPAM, can be hydrated with water to form a hydrated polymer solution with a sufficiently low viscosity to allow for pumping of the solution into a subterranean reservoir. For example, the gel-forming polymer solution can have a starting viscosity (i.e., a viscosity before any crosslinking has occurred) that is greater than the viscosity of water but is less than 50 cP, less than 40 cP, less than 30 cP, less than 20 cP, or less than 10 cP. In some embodiments, starting viscosity can be about 2 cP to about 15 cP, about 3 cP to about 12 cP, or about 4 cP to about 10 cP. In some embodiments, the foregoing viscosity ranges can be at a temperature of about 25° C. In other embodiments, the foregoing viscosity ranges can be at a temperature of about 50° C. In further embodiments, the foregoing viscosity ranges can be across a range of temperatures of about 25° C. to about 100° C., about 30° C. to about 90° C., or about 35° C. to about 80° C. The gel-forming polymer can be hydrated to form a solution prior to pumping into a subterranean reservoir. Alternatively, the gel-forming polymer can be mixed with the hydrating medium (e.g., freshwater or brine) immediately prior to pumping and/or during pumping. For example, the hydrating medium can be pumped through a main line down a wellbore, and the dry gel-forming polymer (or a concentrated solution of the gel-forming polymer) may be injected into the hydrating medium during pumping. Similarly, the core-shell particles may be combined with a hydrated polymer solution prior to pumping and/or during pumping. In some embodiments, the core-shell particles may be combined with the hydrating medium prior to addition of the gel-forming polymer.

Various gel-forming polymers may be combined with a crosslinker provided in a core-shell particle as described herein. In one or more embodiments, the gel-forming polymer particularly may include PAM, HPAM, PVA, sulfonated PAM, and combinations thereof. The properties of the resultant gel may be controlled through selection of the molecular weight of the gel-forming polymer.

Molecular weight can be expressed as a weight average molecular weight ($M_w$) or a number average molecular weight ($M_n$). Both expressions are based upon the characterization of macromolecular solute containing solution as having an average number of molecules ($n_i$) and a molar mass for each molecule ($M_i$). Accordingly, number average molecular weight is defined by formula 1 below.

$$M_n = \frac{\sum n_i M_i}{\sum n_i} \tag{1}$$

Weight average molecular weight (also known as molecular weight average) is directly measurable using light scattering methods and is defined by formula 2 below.

$$M_w = \frac{\sum n_i M_i^2}{\sum n_i M_i} \tag{2}$$

Molecular weight can also be expressed as a Z-average molar weight ($M_z$), wherein the calculation places greater emphasis on molecules with large molar weights. Z-average molar weight is defined by formula 3 below.

$$M_z = \frac{\sum n_i M_i^3}{\sum n_i M_i^2} \tag{3}$$

Unless otherwise noted, molecular weight is expressed herein as weight average molecular weight. In some embodiments, the gel-forming polymer may have a molecular weight of about 50,000 Da to about 2,000,000 Da. In certain embodiments, molecular weight may be in the range of about 100,000 Da to about 900,000 Da, about 250,000 Da to about 750,000 Da, or about 400,000 Da to about 600,000 Da. In other embodiments, molecular weight can be in the range of about 750,000 Da to about 1,750,000 Da, about 800,000 Da to about 1,600,000 Da, or about 900,000 Da to about 1,500,000 Da.

Embodiments of the present disclosure are further illustrated by the following examples, which are set forth to illustrate the presently disclosed subject matter and are not to be construed as limiting. The examples describe testing carried out to confirm the ability of embodiments of the present core-shell particles to deliver and release one or more materials under various conditions that exemplify various environments in which embodiments of the present disclosure may be utilized. In the Examples, the following testing was utilized to characterize the materials.

Particles were analyzed for particle size and polydispersity index ("PDI") using dynamic light scattering ("DLS"), which was carried out with a Malvern Zetasizer Nano ZS instrument. Samples were diluted in deionized water, if needed, before collecting the measurements. Inductively coupled plasma ("ICP") emission spectroscopy used to measure the amount of Cr present in the particles. ICP was carried out using a Thermo iCAP 6500 inductively coupled plasma optical emission spectrometry (ICP-OES). The samples are prepared by first drying the samples to collect starting weights. The dried samples were digested using nitric acid, and heating it at 98° C. This converted all of the Cr to $Cr(NO_3)_2$, which is water soluble. From there, the solution was aspirated into the ICP and the Cr emission was compared to known standard emissions to determine the concentration. Using the data acquired from ICP emission spectroscopy, the following equations were used to determine the % encapsulation efficiency of $Cr^{3+}$ in the nanocapsules and the % loading of $Cr^{3+}$ into the nanocapsules.

$$\text{\% Encapsulation Efficiency} = \frac{\text{Weight of } Cr^{+3} \text{ entrapped in the nanocapsules}}{\text{Total quantity of } Cr^{3+} \text{ added to the reaction}}$$

$$\text{\% Loading of } Cr^{3+} = \frac{\text{Weight of } Cr^{+3} \text{ entrapped in the nanocapsules}}{\text{Total weight of nanocapsules}}$$

Figure 2A:
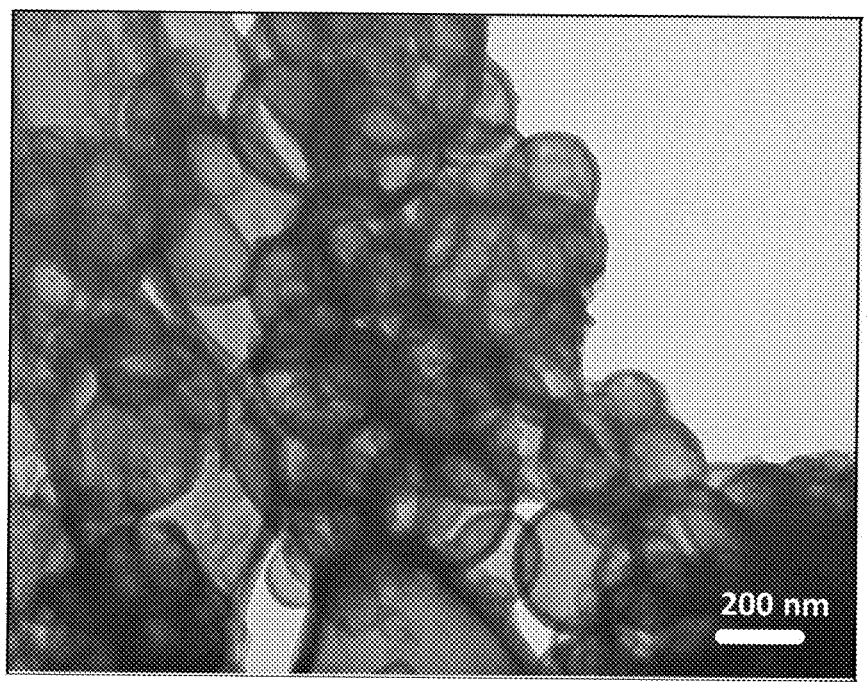
FIG. 2a shows a transmission electron microscopy ("TEM") image for nanocapsules including a $Cr^{+3}$ core and a polyurea shell according to embodiments of the present disclosure.
Figure 2B:
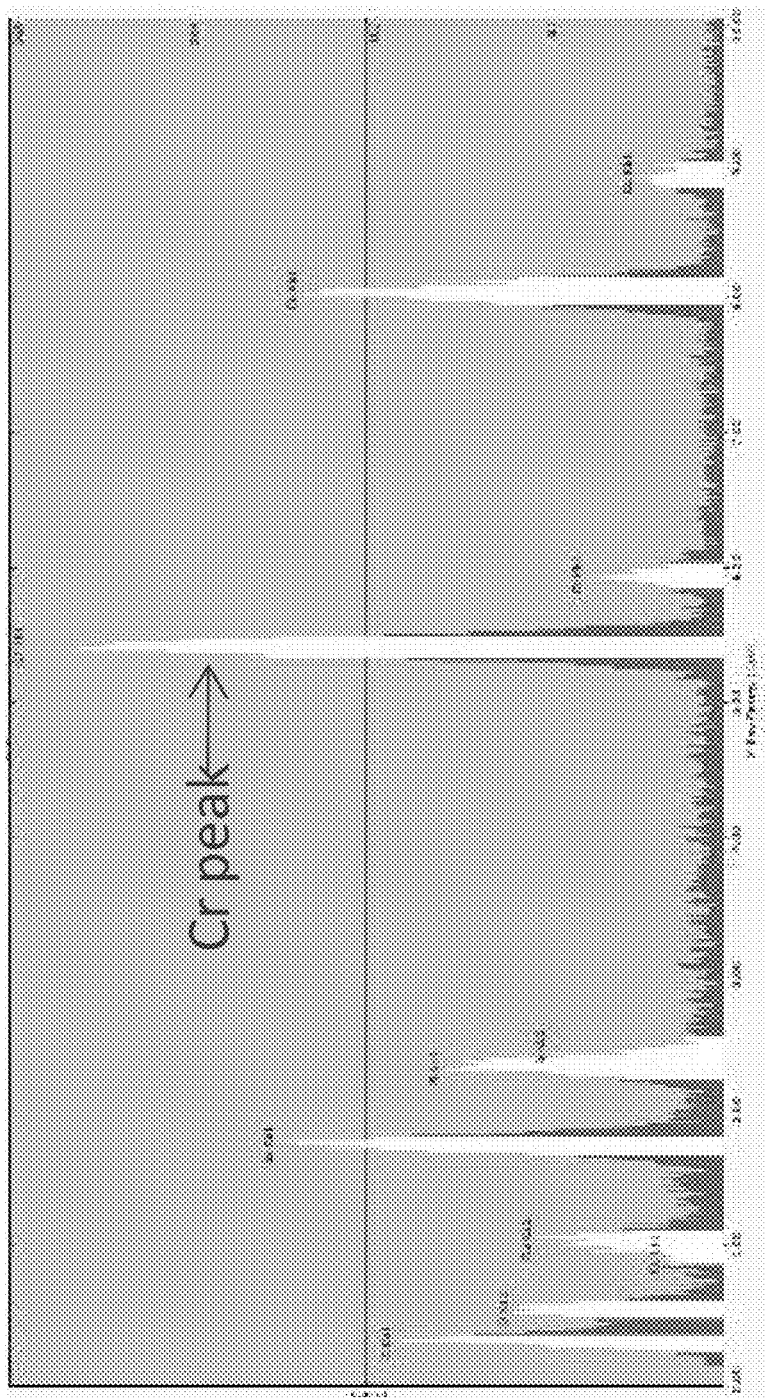
FIG. 2b shows energy dispersive X-ray spectroscopy ("EDS") profile for nanocapsules including a $Cr^{+3}$ core and a polyurea shell according to embodiments of the present disclosure.
Figure 2C:
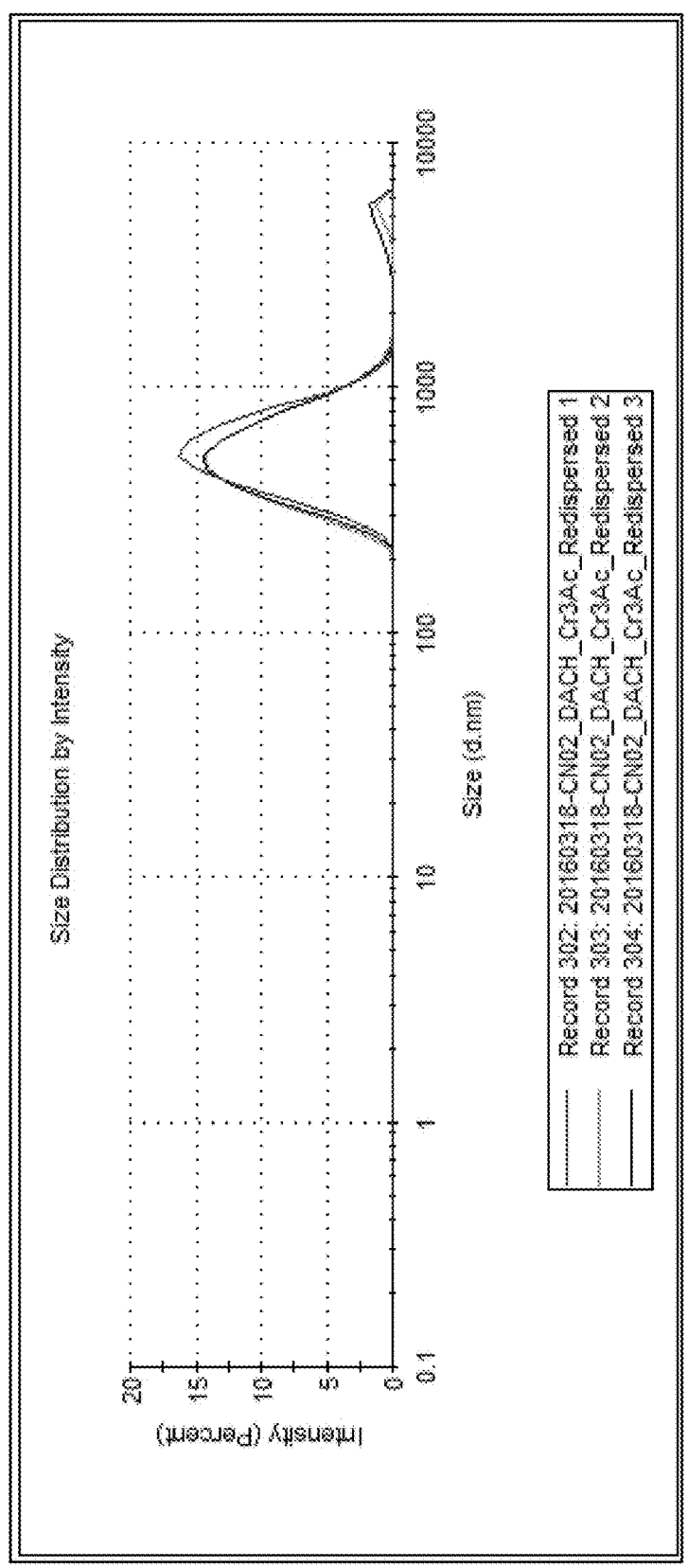
FIG. 2c shows a dynamic light scattering ("DLS") profile for nanocapsules including a $Cr^{+3}$ core and a polyurea shell according to embodiments of the present disclosure.
Figure 3A:
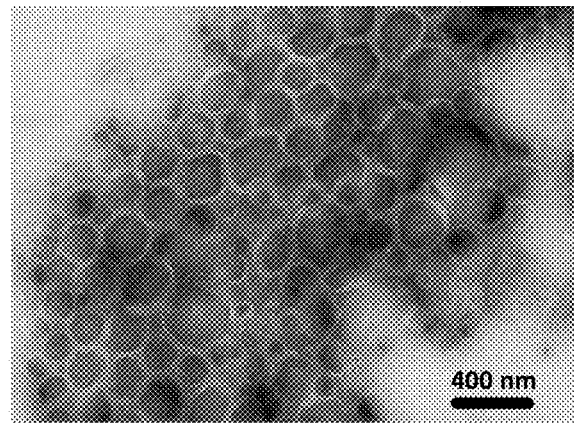
FIG. 3a shows a TEM image of neat polyurea core-shell nanocapsules (400 nm) with a shell formed from V-50 azo monomers and $Cr^{+3}$ core.
Figure 3B:
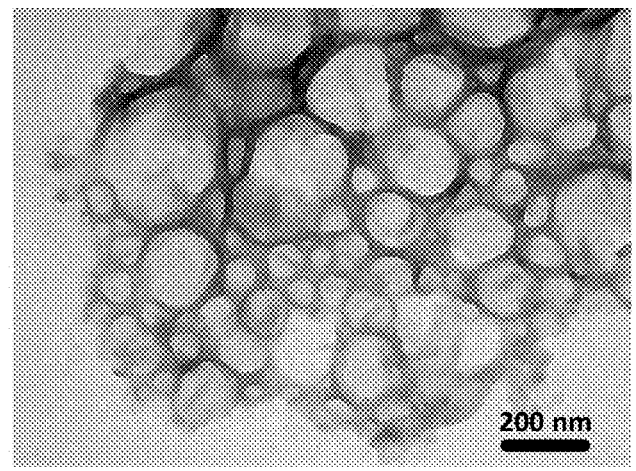
FIG. 3b shows a TEM image of neat polyurea core-shell nanocapsules (200 nm) with a shell formed from V-50 azo monomers and $Cr^{+3}$ core.
Figure 3C:
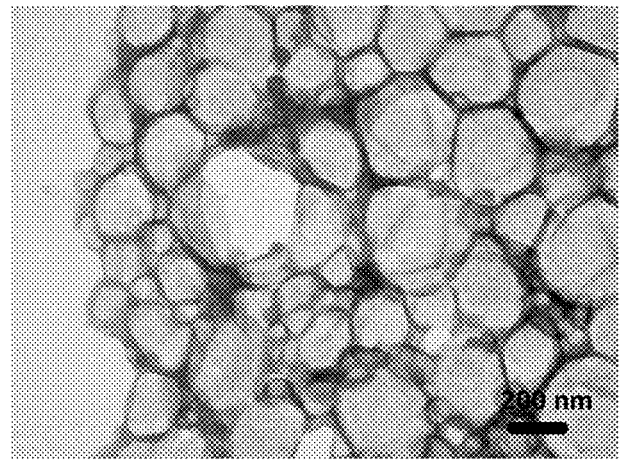
FIG. 3c shows a TEM image of neat polyurethane core-shell nanocapsules (200 nm) with a shell formed from V-86 azo monomers and $Cr^{+3}$ core.
Figure 3D:
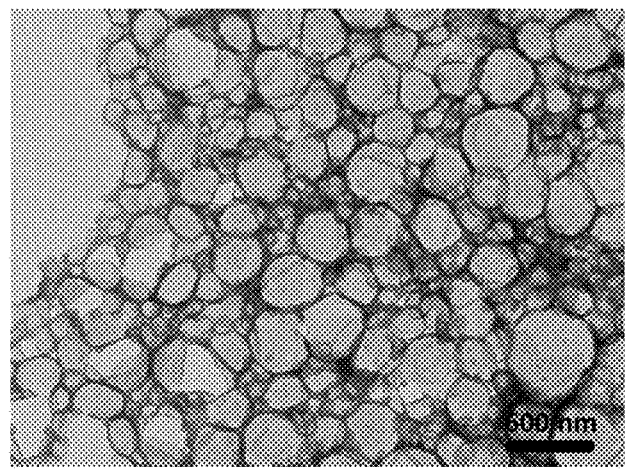
FIG. 3d shows a TEM image of neat polyurethane core-shell nanocapsules (600 nm) with a shell formed from V-86 azo monomers and $Cr^{+3}$ core.

Transmission electron microscopy ("TEM") imaging was carried out using an FEI Tecnai $G^2$ model TEM with an accelerating voltage of 200 kV. Energy dispersive X-ray spectroscopy ("EDS") was used to evaluate core-shell morphology and Cr intensity. Thermogravimetric analysis ("TGA") was performed using a TA Instruments TGA. Cured samples were loaded into the TGA and run under a nitrogen gas ($N_2$) atmosphere, at a ramp rate of 10° C./min to 600° C. Differential scanning calorimetry ("DSC") was performed using a Q200 DSC instrument from TA Instruments, which determined the glass transition temperature (Tg). The dried sample was placed in a hermetic aluminum pan containing a puncture to enable the escape of volatile components. FIG. 2a shows a TEM image of nanocapsules including a polyurea shell (prepared with TDI and DACH) and a $Cr^{+3}$ core. An EDS profile thereof is shown in FIG. 2b, and a DLS profile is shown in FIG. 2c.

To monitor gelation between HPAM and $Cr^{3+}$ or HPAM and core-shell nanocapsules that contain $Cr^{3+}$, a TA Instruments AR 2000ex rheometer was used. Samples were incubated for the prescribed time in an oven at 50° C., loaded onto the rheometer fitted with a 40 mm plate geometry at a gap of 500 μm, and then performed testing by using a stepped-flow procedure during which we incrementally increased the shear rate from 0.1 1/s to 100 1/s. Each test took approximately 15 minutes, so sample drying was not a factor. The quantity of nanocapsules needed for each experiment was determined from the ICP emission spectroscopy data.

EXAMPLE 1

Preparation of Nanocapsules Encapsulated with Chromium

Core-shell nanocapsules with encapsulated chromium were prepared using interfacial polycondensation via inverse mini-emulsion (water-in-oil) method. An aqueous phase solution was prepared by combining 0.221 g of hydrophilic monomer Diaminocyclohexane ("DACH") with 0.36 g of chromium(III) acetate hydroxide (cargo material) and 2.6 g of deionized water. In a separate container, continuous oil phase part 1 was prepared by mixing 15 g of cyclohexane solvent and 0.15 g of surfactant (Doversperse® H1015P polyisobutylene succinimide). By drop-wise addition, the aqueous phase was added to the part 1 continuous or oil phase and allowed to stir for 1 hour with a magnetic stirrer for pre-emulsification. To prepare the mini-emulsion, the solution was subsequently ultrasonicated for 180 seconds at 70% amplitude and 50% pulsing using a small stainless steel tip. Next, continuous oil phase part 2 was prepared in a separate container by mixing 10 g cyclohexane solvent, 0.5 g toluene diisocyanate ("TDI"), and 0.07 g surfactant (Doversperse® H1015P polyisobutylene succinimide). This mixture was added dropwise to the mini-emulsion over 300 seconds, and the reaction was allowed to stir at 400-500 rpm for 24 hours at room temperature.

Thus-formed nanocapsules then underwent a phase transfer from the oil phase (cyclohexane) to an aqueous phase consisting of deionized water and surfactant (sodium dodecyl sulfate ("SDS")) as part of the re-dispersion process. During the phase transfer, the nanocapsules were mixed with the surfactant solution and then underwent ultrasonication for 60 seconds at 20% amplitude and 50% pulsing. The mixture was allowed to stir uncovered (at room temperature) overnight using a magnetic stirrer to allow the cyclohexane to evaporate. Once the nanocapsules were successfully transferred, they were cleaned to remove any un-encapsulated chromium via either dialysis tubing or by use of the silica-based Cr scavenger silica-thiol (e.g., SiliaMetS®).

EXAMPLE 2

Selection of Monomers Compatible with Chromium

In order to produce chromium containing nanocapsules that are industrially useful, it is important that the chemicals used to make the polymer shells do not undergo an irreversible reaction with the chromium. Selection of the isocyanate component of a polyurea polymer shell that will not react with chromium ions is simple, as chromium salts are not soluble in typical isocyanates, which precludes reaction. Selection of an amine functional component of a polyurea polymer shell is complicated by a side reaction in which chromium ions can chelate with the diamines. This reaction is not reversible in practical terms. Note that this reaction does not occur simply as a function of diamine content, but also as a function of the chemical structure. Certain diamines have a structure that promotes chelation of chromium and others do not.

Chelation screening was performed by mixing Cr(III) Acetate into a solution of brine and each candidate diamine. These were stirred for an hour at 50° C. to allow any reaction to take place. 50,000 ppm of 20% hydrolyzed 520,000 MW HPAM was then added to each vial. The vials were then stirred vigorously until the HPAM was completely dissolved. They were then incubated overnight in an oven at 50° C. If a gel formed, the diamine did not chelate the chromium, allowing it to react. Samples that did not gel had experienced chelation of the chromium and the diamine. A second set of vials was made as a negative control which did not contain chromium. These all failed to gel, indicating that none of the diamines caused the HPAM to gel on their own.

EXAMPLE 3

Preparation of Nanocapsules that Contain Degradable Azo Shells

Particles with shells that contain an azo-based degradable chemistry were prepared by interfacial polyaddition in inverse mini-emulsion. An aqueous phase solution was prepared in a small container by combining 0.356 g of hydrophilic monomer 2,2'-Azobis(2-methylpropionamidine)dihydrochloride with 0.179 g of chromium(III) acetate hydroxide (cargo material) and 2.6 g of deionized water. In a separate jar, continuous oil phase part 1 was prepared by mixing 12 g of cyclohexane solvent and 0.10 g of surfactant (Doversperse® H1015P polyisobutylene succinimide). By dropwise addition, the aqueous phase was added to the continuous oil phase part 1 and allowed to stir for 1 hour with a magnetic stirrer for pre-emulsification. To prepare the mini-emulsion, the solution was subsequently ultrasonicated for 180 seconds at 70% amplitude and 50% pulsing using a small stainless steel tip. Continuous oil phase part 2 was prepared in a separate container by mixing 8 g cyclohexane solvent with 0.34 g toluene diisocyanate (TDI) and added dropwise to the mini-emulsion over 300 seconds. The mixture was allowed to react by stirring at approximately 400-500 rpm for 24 hours at room temperature. From here, the nanocapsules in their original neat form, were characterized by TEM and EDS for evidence of core-shell morphology and the presence of Cr in the nanocapsules. Similar phase transfer techniques as described in Example 1 were used to re-disperse the particles in water. As an example, FIG. 3a through FIG. 3d shows TEM images of core-shell nanocapsules that are formed with shells that contain degradable groups. In these examples, the shell contained the azo-containing monomers V-50 (2,2'-azobis(2-methyl-propionamidine)dihydrochloride) or V-86 (2,2'-azobis[2-methyl-N-(2-hydroxyethyl)propionamide), both available from Wako Specialty Chemicals.

EXAMPLE 4

Preparation of Nanocapsules Containing Hydrolysis-Degradable Shells

Core-shell nanocapsules using interfacial polycondensation via inverse mini-emulsion (water-in-oil) method were prepared that contain hydrolytically degradable groups in the polymer shells. An aqueous phase solution was prepared in a small container by combining 0.1027 g of hydrophilic monomer glycerol with 0.04 g of chromium(III) chloride (cargo material) and 1.3 g of deionized water. In a separate container, continuous phase part 1 was prepared by mixing 7.5 g of cyclohexane solvent and 0.075 g of non-ionic surfactant (Span 80—sorbitan monooleate) and vortexed for 15 seconds at speed 2700 on a digital vortexer. By dropwise addition, the aqueous phase was added to continuous oil phase part 1 and allowed to stir for 1 hour with a magnetic stirrer for pre-emulsification. To prepare the mini-emulsion, the solution was subsequently ultrasonicated for 180 seconds at 70% amplitude and 50% pulsing using a small stainless steel tip. Continuous oil phase part 2 was prepared in a separate container by mixing 5 g cyclohexane solvent, 0.32 g TDI, and 0.035 g surfactant (Span 80—sorbitan monooleate). This mixture was added dropwise to the mini-emulsion over 300 seconds and the reaction allowed to stir at approximately 400-500 rpm for 2 hours at 60° C. Again, the nanocapsules in their original neat form were characterized using TEM and EDS for evidence of core-shell morphology and the presence of Cr in the nanocapsules. Similar phase transfer techniques as described in Example 1 were used to re-disperse the particles in water.

In another preparation, nanocapsules containing hydrolytically degradable polycaprolactone were synthesized using interfacial polycondensation via inverse mini-emulsion. An aqueous phase solution was prepared by combining 0.221 g of hydrophilic monomer Diaminocyclohexane ("DACH") with 0.36 g of chromium(III) acetate hydroxide (cargo material) and 2.6 g of deionized water. In a separate container, continuous oil phase part 1 was prepared by mixing 15 g of cyclohexane solvent and 0.15 g of surfactant (Doversperse® H1015P polyisobutylene succinimide). By drop-wise addition, the aqueous phase was added to the part 1 continuous or oil phase and allowed to stir 5 for 1 hour with a magnetic stirrer for pre-emulsification. To prepare the mini-emulsion, the solution was subsequently ultrasonicated for 180 seconds at 70% amplitude and 50% pulsing using a small stainless steel tip. Next, continuous oil phase part 2 was prepared in a separate container by mixing 10 g dichloromethane solvent, 0.1 g toluene diisocyanate ("TDI"), 0.26 g polycaprolactone diol (Mn=530 g/mol) and 0.07 g surfactant 10 (Doversperse® H1015P polyisobutylene succinimide). This mixture was added dropwise to the mini-emulsion over 300 seconds, and the reaction was allowed to stir at 400-500 rpm for 24 hours at room temperature. Similar phase transfer techniques as described in Example 1 were used to redisperse the particles in water.

EXAMPLE 5

Delayed Gelation of HPAM Using Nanocapsules

Delayed gelation of HPAM using chromium containing nanocapsules was demonstrated by vial tests in which nanocapsules were allowed to react with a solution of 20,000 ppm 20% hydrolyzed 520,000 MW HPAM in brine. The chromium concentration of the mixture was set at one tenth the amount of chromium needed to stoichiometrically react with the HPAM. These concentrations were selected to give a useful injectable solution with a starting viscosity of approximately 6 cP. When gelled with un-encapsulated chromium, such a solution produced a moderately flowing "tonguing gel." Samples were sealed into glass vials and incubated at 50° C. Aliquots were tested on a rheometer using a 60 mm parallel plate geometry on a daily or weekly basis to determine extent of delayed gelation.

EXAMPLE 6

Rheology Evaluations of Gelation Between HPAM and Chromium

Figure 4:
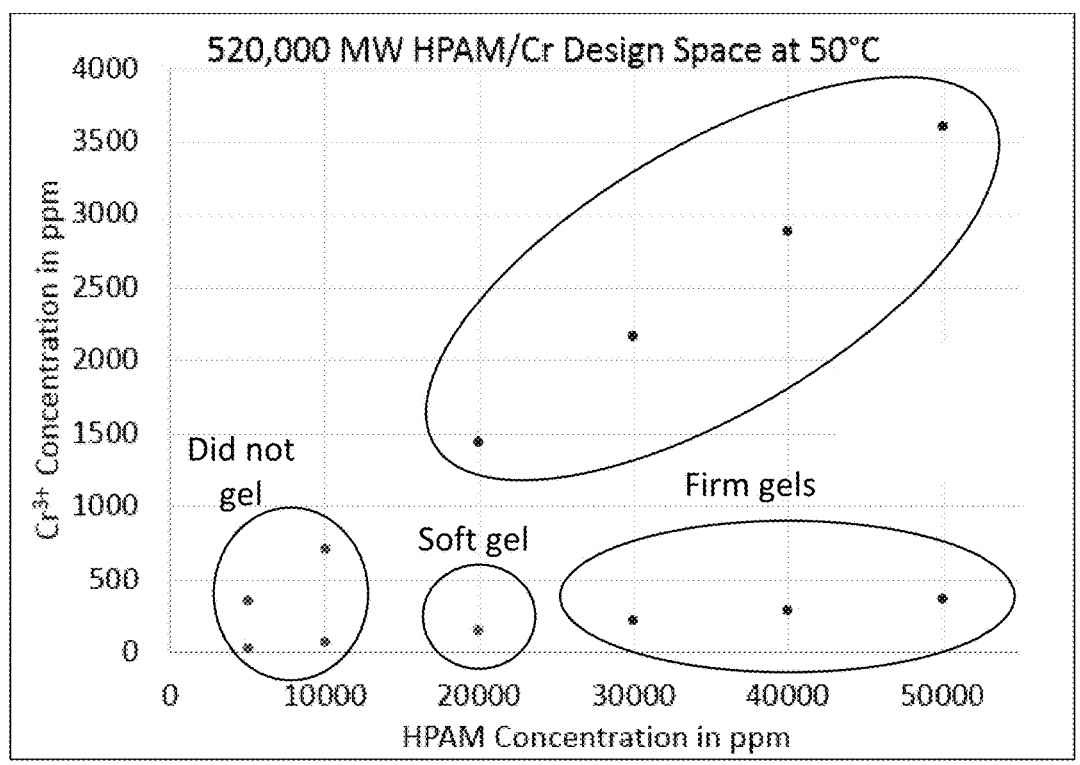
FIG. 4 is a graph showing gelation behavior of combinations of unencapsulated $Cr^{+3}$ and HPAM, both at various concentrations.

Rheology of the gelling systems was evaluated by testing a series of samples that contained a HPAM from concentrations of 50,000 ppm to 5,000 ppm and Chromium(III) Acetate crosslinker at stoichiometric and one-tenth stoichiometric concentrations. These gels were made using a brine containing 0.5 M NaCl and 3.5 mM $CaCl_2$. Initial viscosity was measured using a TA Instruments AR-550 rheometer fitted with a Peltier plate and a 60 mm parallel plate geometry. Testing was conducted at a gap of 500 µm with a shear ramp from 0.01 to 1,000 1/s. Data points were reported at 10 1/s. Vials of the gel formulations were sealed and incubated at 50° C. between measurements. All formulations of 30,000 ppm HPAM and higher formed strong ringing gels. At 20,000 ppm, the sample with a stoichiometric amount of chromium formed a ringing gel, while the one with one-tenth the stoichiometric formed a moderately flowing "tonguing gel." All samples with 10,000 ppm HPAM and less showed no signs of gelation, regardless of chromium loading. FIG. 4 shows the design space of gelation behavior of un-encapsulated $Cr^{+3}$ at different concentrations and HPAM at different concentrations. The systems either formed a firm gel, a soft gel, or no gel.

EXAMPLE 7

Evaluating Mobility of Nanoparticles in a Sandpack Column

A sand pack column was filled with 75-100 µm sieved sand and deionized water. It was then pressurized with water at flow rates from 0.5 to 10 mL/minute. The calculated permeability was stable across all flow rates at about 5.2 Darcy. 60 mL of dilute $Cr^{+3}$ nanoparticle solution was prepared for testing. This fluid contained a small amount of surfactant necessary to re-disperse the particles. It was flowed into the column via a syringe pump and delivered as 3 injections of 20 mL each at a rate of 10 mL/minute. 50 mL of solution were passed through the column before collecting the last 10 mL for analysis. Virgin $Cr^{+3}$ nanoparticles and the material which had passed through the sand pack were tested for $Cr^{+3}$ content via ICP analysis. It was found that both samples had nearly identical $Cr^{+3}$ concentrations. The column had a calculated permeability of 5.35 Darcy during the nanoparticle injection.

EXAMPLE 8

Preparation of Core-Shell Nanoparticles

An inverse interfacial mini-emulsion technique similar to that described in Example 1 was utilized to prepare core-shell nanocapsules that contained $Cr^{+3}$ within the core. Briefly, an aqueous phase was prepared that contained water, a water soluble monomer, and either $Cr^{+3}$ Acetate or $Cr^{+3}$ Chloride. A hydrophobic solution was prepared as the continuous phase that contained cyclohexane, a hydrophobic monomer, and a surfactant. The aqueous phase and hydrophobic phase were combined and sonicated using an ultrasonic horn with a flat-tip probe set at output 7 and 50% pulsing to form a single emulsion. The reaction was allowed to mix to permit the interfacial polymerization reaction between the water-soluble monomer and hydrophobic monomer to form nanocapsules containing Cr(III). The reaction occurred for at least 2 hours at 25° C. to form polyurea nanocapsules or for 2 hours at 60° C. to form the polyurethane nanocapsules.

EXAMPLE 9

Core-Shell Material Compatibility Testing

Successful encapsulation required compatibility between the $Cr^{+3}$ core material and the polymerization scheme used to prepare the shell. Prior work in the field has shown the inability to use certain polymerization processes when encapsulating strong mineral acid into polymer particles due to undesirable side reactions. Here, the encapsulation of chromium within nanocapsules required consideration of chemistries specific to metal, particularly chelation bonding. Various ligands exist that form stable coordinating complexes with $Cr^{+3}$, including polynicotinate, phenylalanine, and acetylacetonate. To successfully crosslink HPAM, the chromium metal was required to maintain the ability to form coordinate bonds between the carboxylic acid groups on the backbone of the HPAM polymer. If the chromium metal is chelated, it will not be capable of forming coordination complexes with the HPAM polymer upon release from the nanocapsule. The approach for preparing core-shell nanocapsules thus must be devoid of competing components capable of forming chelation complexes with the metal.

In order to ensure compatibility between chromium and the components utilized to prepare the nanocapsules, various monomers were evaluated to determine if chelation occurred with the chromium metal, thereby hindering the process for preparation of particles. Certain monomers readily chelate $Cr^{+3}$, thereby precluding the subsequent reaction with HPAM (or other polymers).

Utilizing monomers down-selected from screening studies, both polyurethane and polyurea core-shell nanocapsules that contained $Cr^{+3}$ within the core were prepared. Overall, three shell formulations were prepared (i.e., Formulation A, B, and C) with each formulation containing either $Cr^{+3}$ within the shell or NaCl within the shell as a control. See TABLE 1 below.

TABLE 1

| Formulation | Shell | Core |
| --- | --- | --- |
| A-1 | Non-Degradable | NaCl |
| A-2 | Non-Degradable | $Cr^{+3}$ |
| B-1 | Degradable | NaCl |
| B-2 | Degradable | $Cr^{+3}$ |
| C-1 | Degradable | NaCl |
| C-2 | Degradable | $Cr^{+3}$ |

Figure 5A:
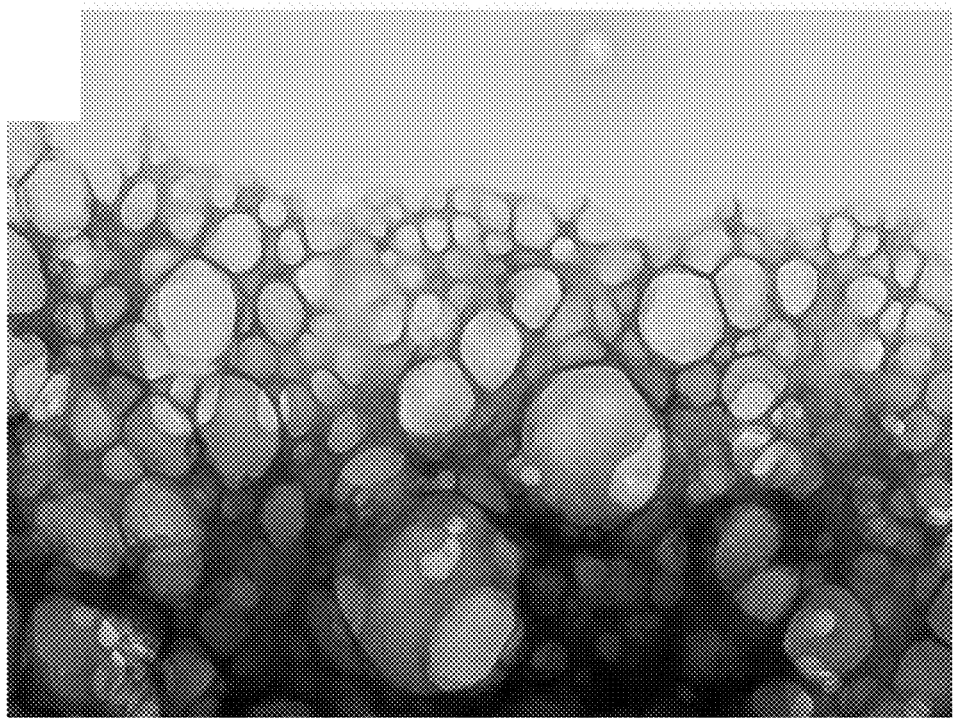
FIG. 5a shows a TEM image of core-shell nanocapsules including non-degradable shells and a NaCl core according to embodiments of the present disclosure.
Figure 5B:
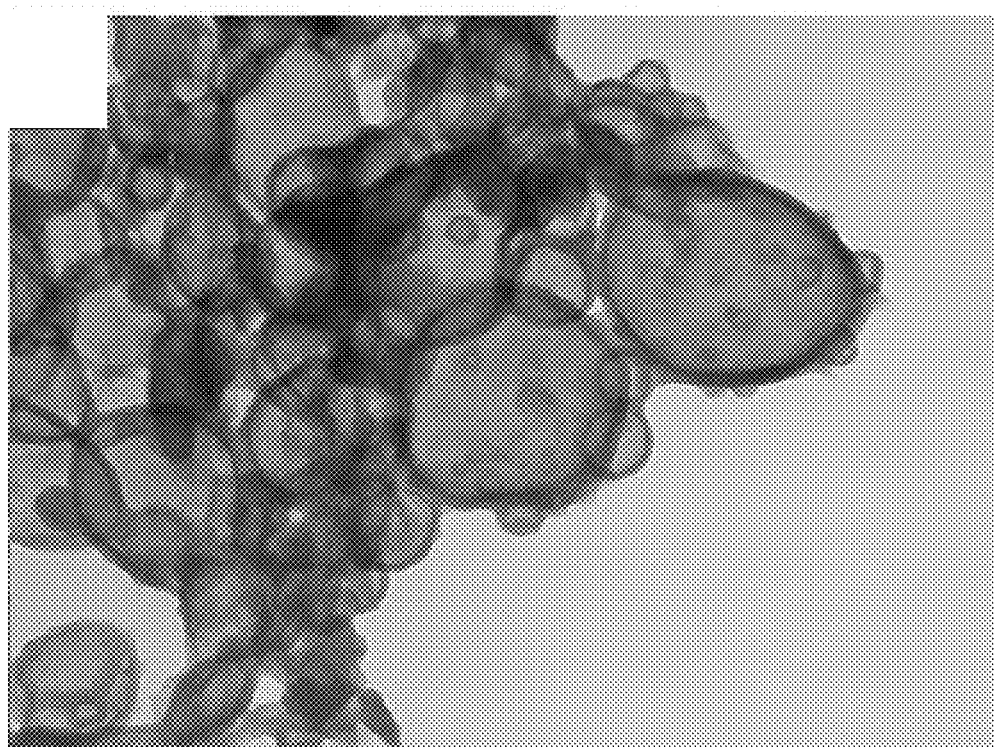
FIG. 5b shows a TEM image of core-shell nanocapsules including non-degradable shells and a $Cr^{+3}$ core according to embodiments of the present disclosure.
Figure 5C:
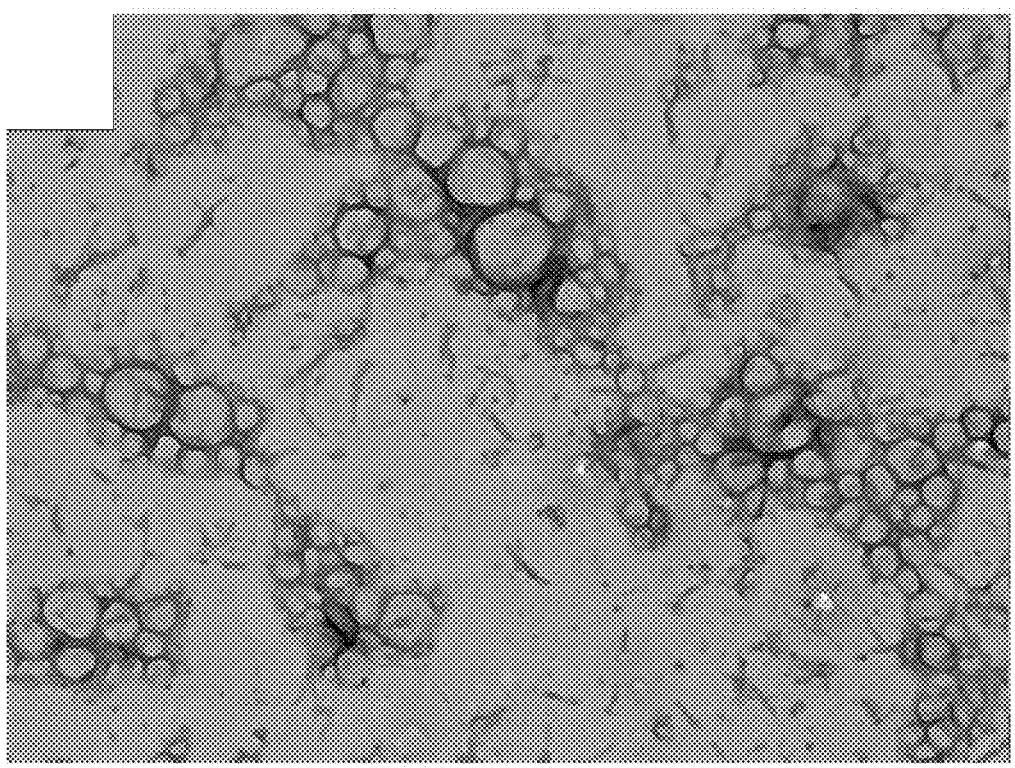
FIG. 5c shows a TEM image of core-shell nanocapsules including degradable shells and a NaCl core according to embodiments of the present disclosure.
Figure 5D:
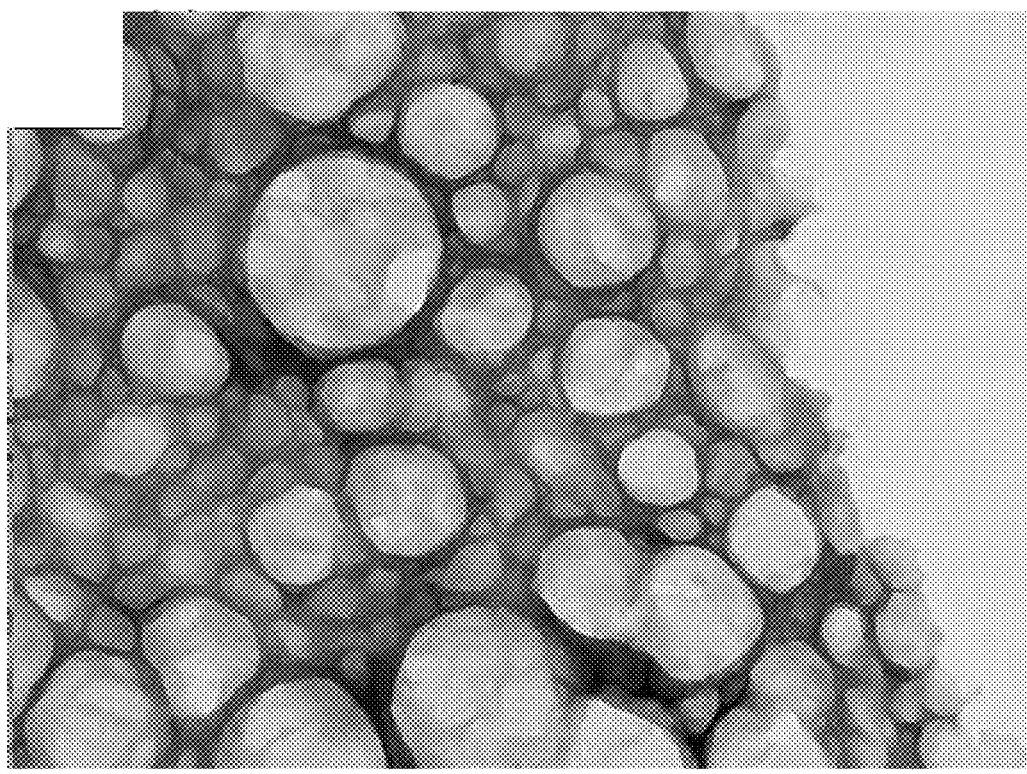
FIG. 5d shows TEM images of core-shell nanocapsules including degradable shells and a $Cr^{+3}$ core according to embodiments of the present disclosure.

The TEM images shown in FIG. 5a through FIG. 5d show that these formulations produced nanocapsules with a clear distinction between the shell and core. In most cases, the particle morphology of the nanocapsules was substantially spherical (and sometimes oblong) with particle sizes in the submicron range, around 200-400 nm. FIG. 5a corresponds to Formulation A-1, FIG. 5b corresponds to Formulation A-2, FIG. 5c corresponds to Formulation B-1, and FIG. 5d corresponds to Formulation B-2.

Further characterization was performed to quantify the amount of $Cr^{+3}$ within the nanocapsule. In one approach, ICP emission spectroscopy analysis was performed to determine two parameters: (1) the percent encapsulation efficiency of chromium within the nanocapsules, and (2) the % loading of chromium within the nanocapsules. As shown in TABLE 2, the encapsulation efficiency of $Cr^{+3}$ within the particles prior to purification was high, at 86% and 92% for Formulations A-2 and B-2, respectively.

TABLE 2

| Formulation | Tg (° C.) | $T_D$ (° C.) | % Encapsulation Efficiency of $Cr^{3+}$ | % Loading of $Cr^{3+}$ | Size Distribution (nm) | PDI |
| --- | --- | --- | --- | --- | --- | --- |
| A-1 | 103 | 248 | — | — | 320 | 0.2 |
| A-2 | 103 | 234 | 62 | 2.1 | 540 | 0.2 |
| B-1 | — | 129 | — | — | 220 | 0.2 |
| B-2 | 100 | 150 | 54 | 4.2 | 350 | 0.4 |
| C-1 | — | 131 | — | — | 340 | 0.3 |
| C-2 | — | 111 | 23 | 2 | 320 | 0.3 |

Figure 6A:
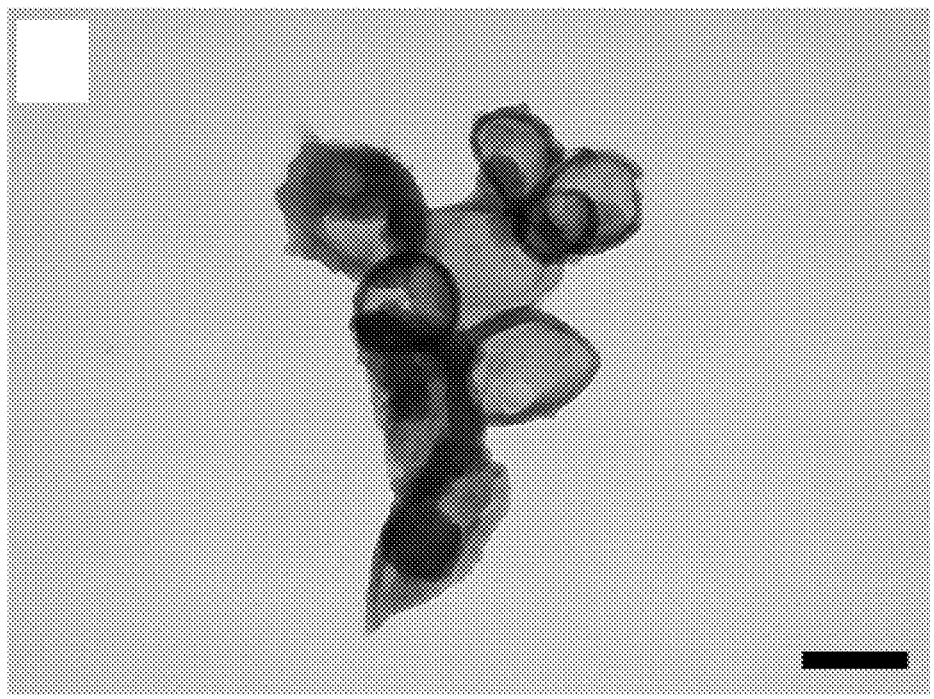
FIG. 6a shows a TEM image of core-shell nanoparticles having a polyurea shell without $Cr^{+3}$ in the core.
Figure 6B:
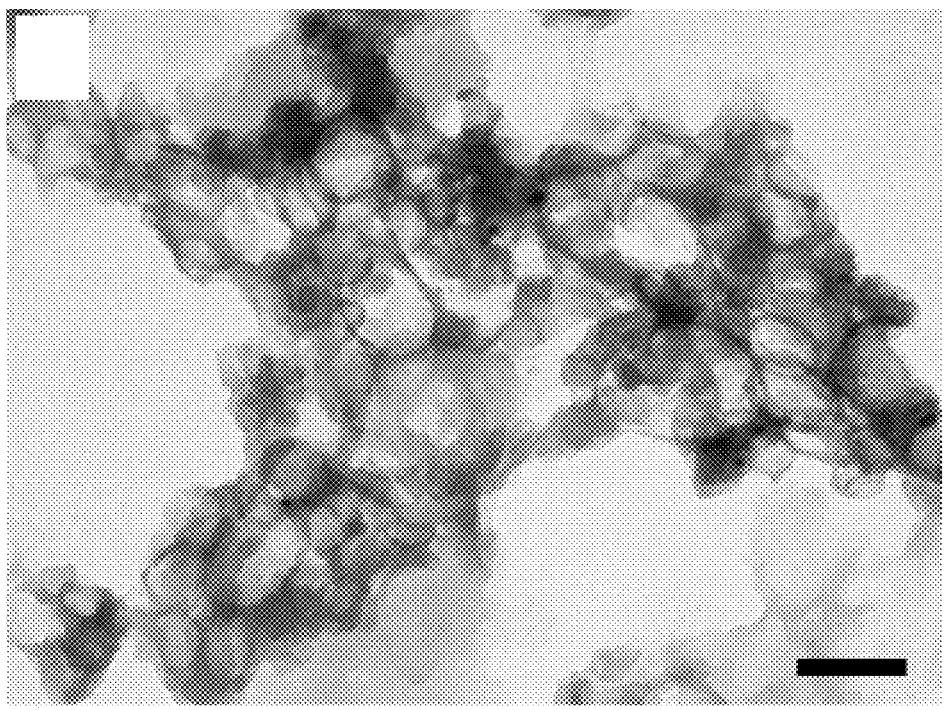
FIG. 6b shows a TEM image of core-shell nanoparticles having a polyurethane shell without $Cr^{+3}$ in the core.
Figure 6C:
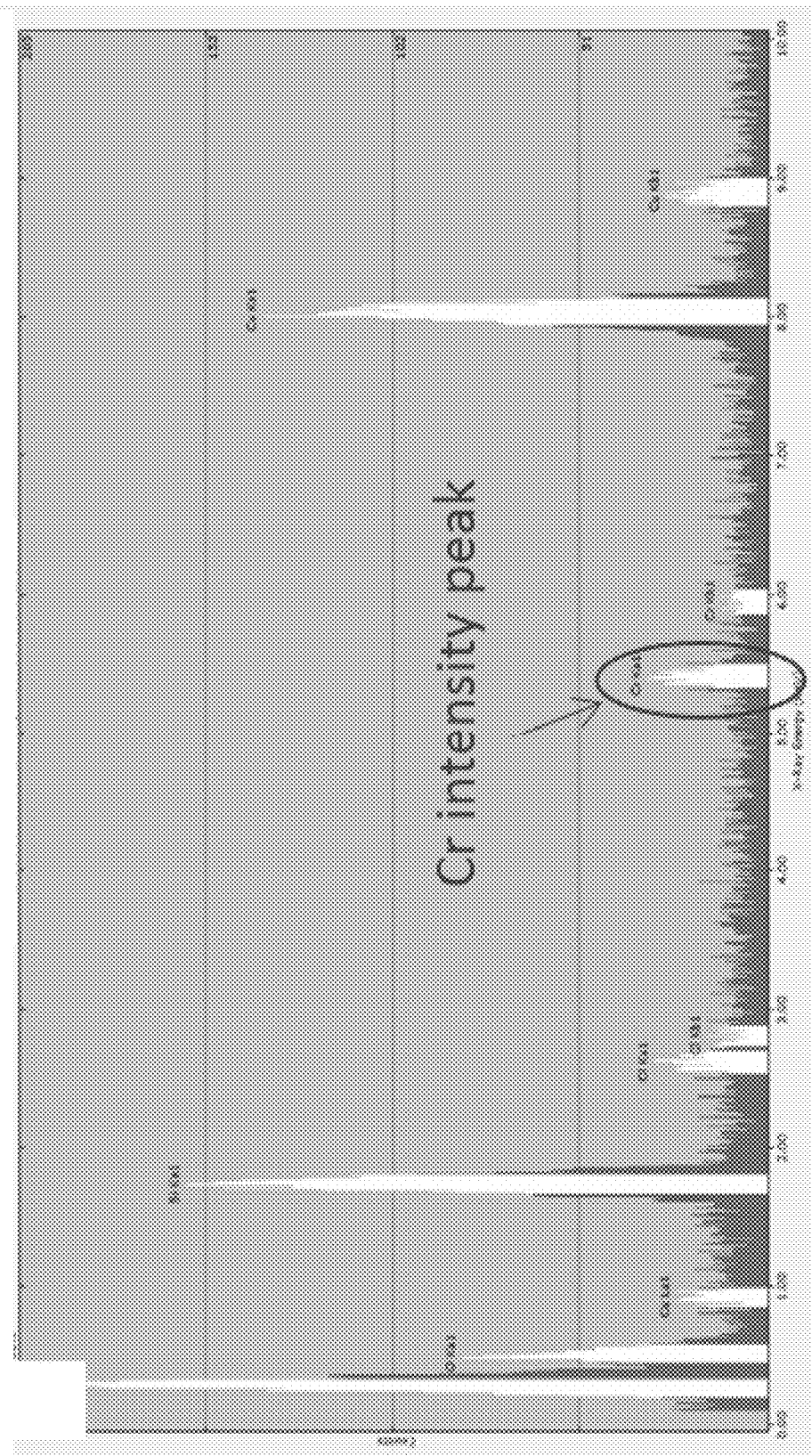
FIG. 6c shows an EDS profile of particles with $Cr^{+3}$.
Figure 6D:
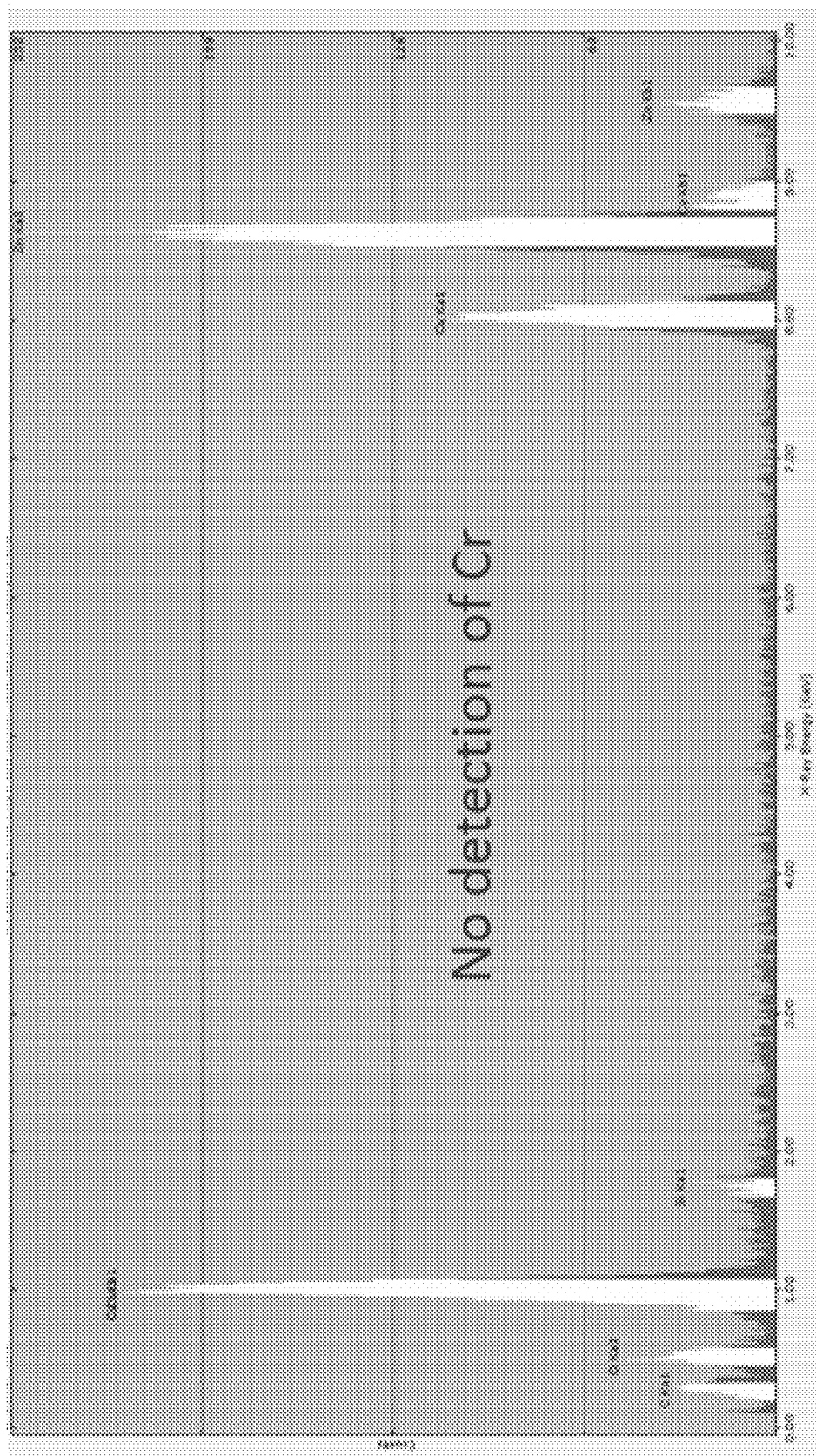
FIG. 6d shows an EDS profile of particles without $Cr^{+3}$.

After dispersion in water and subsequent purification, the encapsulation efficiency slightly decreased; however, it still remained near 60% verifying the presence of chromium within the particles. In general, the percent loading of $Cr^{+3}$ was typically between 2-4% within the nanocapsules. Additionally, EDS was used to demonstrate the presence of $Cr^{+3}$ within the core-shell nanocapsule. For example, the elemental analysis showed the presence of a peak for chromium for nanocapsules prepared with the metal, and the absence of a peak for negative control particles prepared without the metal. In FIG. 6a, the TEM image shows polyurea with no $Cr^{3+}$ core. In FIG. 6b, the TEM image shows polyurethane with no $Cr^{3+}$ core. In FIG. 6c, the EDS graph relates to polyurethane particles with and without $Cr^{+3}$. In FIG. 6d, the EDS graph relates to particles with and without Cr(III).

Figure 7:
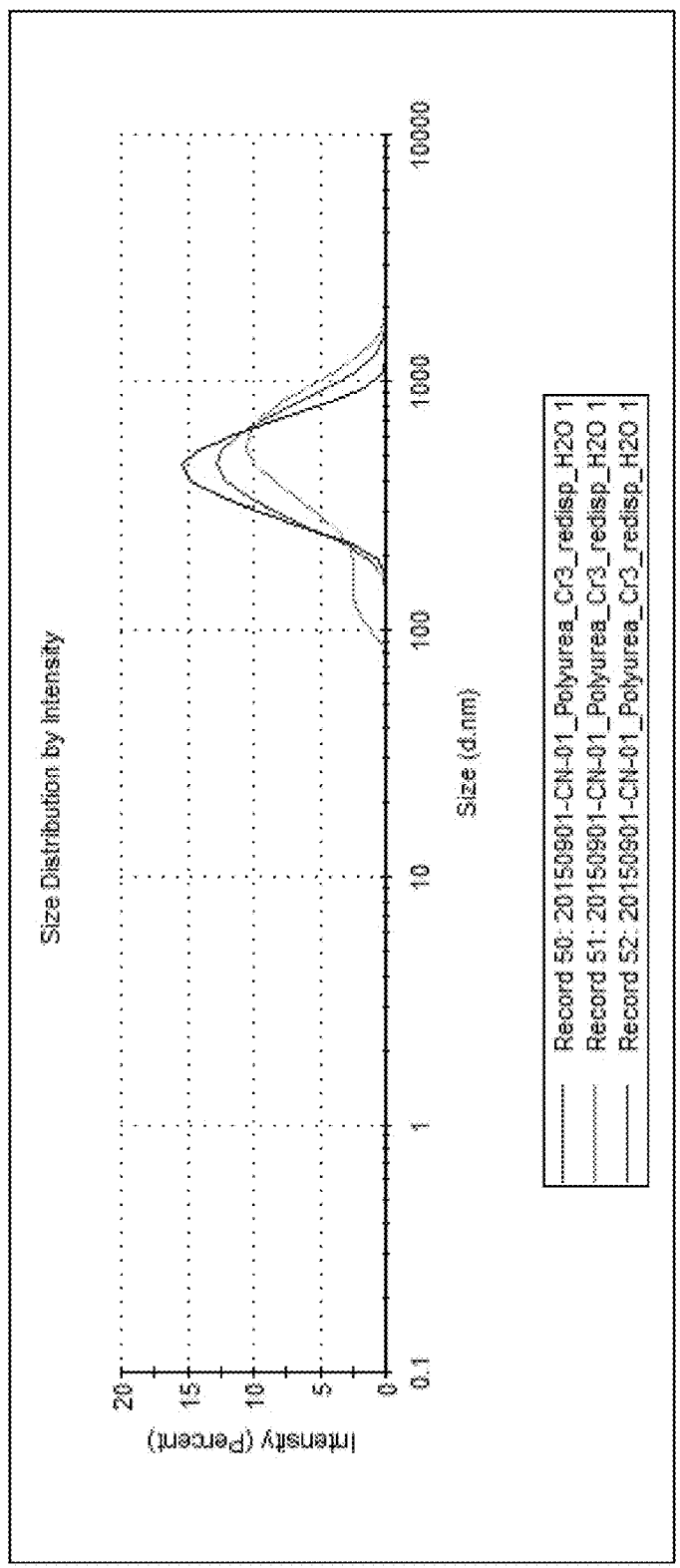
FIG. 7 is a DLS profile of core-shell particles having a non-degradable shell and a core with NaCl.

Additional characterization of the core-shell nanocapsules was performed to further understand the properties of the particles and the compatibility with chromium salts. In general, the size distributions of the particles were submicron, typically measuring between 200 nm and 400 nm with polydispersities between 0.2 and 0.4 (as seen in TABLE 2). For example, the DLS graph in FIG. 7 shows the size distribution of core-shell nanocapsules including polyurea shells, which measured submicron. Each plot is for a polyurea shell nanocapsule with a $Cr^{+3}$ core. Additional characterization of particles revealed that inverse mini-emulsion with interfacial polymerization is highly amenable for use with chromium salts. For example, the DSC profiles of the particles reveal minimal differences between the as-synthesized particles prepared with NaCl in the core or $Cr^{3+}$ in the core (see TABLE 2). For instance, Formulation A-1 (NaCl core) and Formulation A-2 ($Cr^{+3}$ core) both show a glass transition temperature (Tg) of 103° C. and an onset of decomposition temperature ($T_D$) of 234° C.

EXAMPLE 10

Performance Studies

Figure 8:
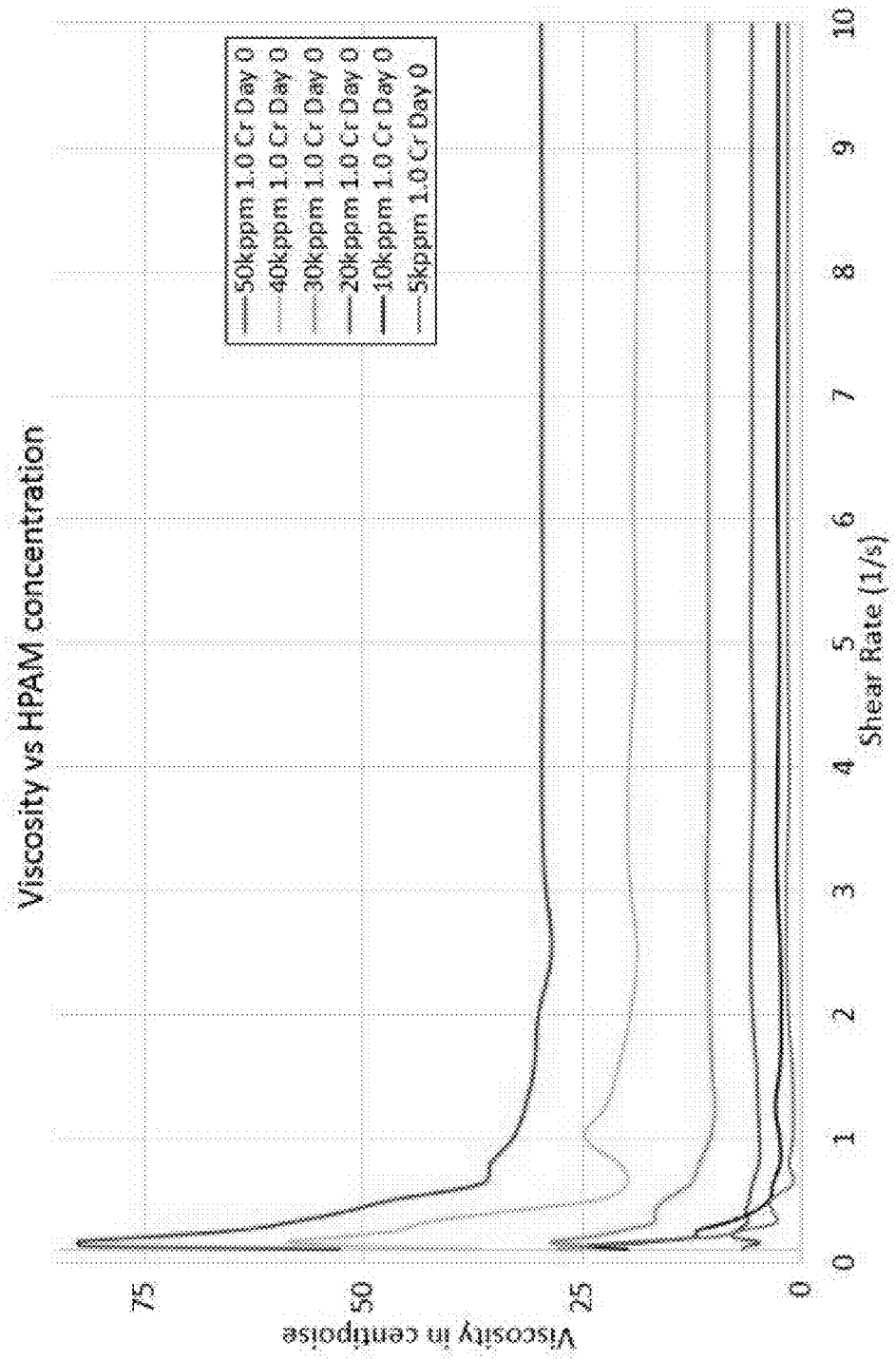
FIG. 8 is a graph showing initial viscosity profiles (time=0) at various shear rates for HPAM solutions containing stoichiometric quantities of $Cr^{+3}$.

Various parameters must be considered to ensure that the performance of nanocapsules meet the requirement in the field, in terms of stability, viscosity, and gelation kinetics. An important performance consideration involves the starting viscosity of the HPAM/nanocapsule mixture. Here, an initial viscosity of ≥10 cP was targeted to support the delivery and transport in sandstone formations. To first assess the range HPAM concentration that meets the targeted viscosity, rheological analysis was performed on solutions of HPAM and $Cr^{+3}$ immediately after combination of the two components (i.e., time=0). As expected, rheological analysis showed that an increase in HPAM concentration accompanied an increase in viscosity in the absence of nanocapsules, with the system exhibiting Newtonian behavior above a shear rate of approximately 2 $sec^{-1}$ (see FIG. 8). Importantly, the inclusion of nanocapsules within the HPAM had negligible effect on the viscosity under these experimental conditions. For example, at a shear rate of 5 $sec^{-1}$, 20 kppm of HPAM showed a viscosity of 5.7 cP, whereas 20 kppm of HPAM combined with nanocapsules showed a viscosity of 24 cP.

Figure 9:
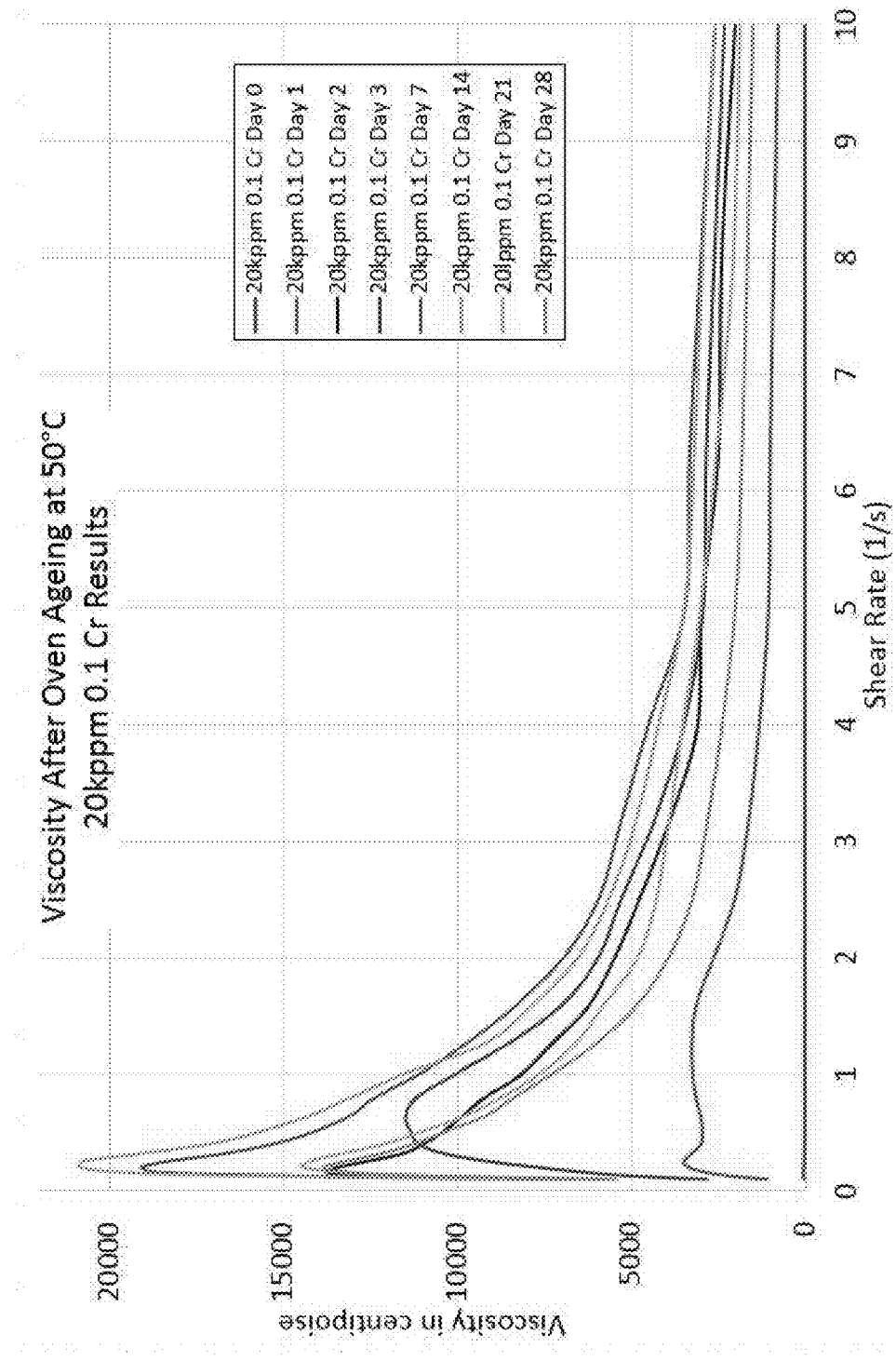
FIG. 9 is a graph showing viscosity profiles at various shear rates during the gelation of 20 kppm of HPAM with one-tenth stoichiometric ratio of $Cr^{+3}$.

To explore the kinetics of gelation, a series of control rheological evaluations were performed using HPAM (MW ~550,000) and unencapsulated $Cr^{+3}$. These rheological evaluations served as a baseline to compare the kinetics of gelation when using nanocapsules. In accordance to prior reports, these studies revealed that two parameters substantially affect gelation kinetics: the concentration of HPAM and the calculated stoichiometric ratio between $Cr^{3+}$ and the carboxylic acid groups on the polymer chain. For example, concentrations of HPAM <20 kppm showed no gelation regardless of the concentration of $Cr^{+3}$ acetate. Conversely, HPAM concentrations >20 kppm rapidly generated firm gels, which were unsuitable for rheological evaluation due to rapid reaction rates. However, these rapidly forming gels were suitable for the semi-quantitative analysis of gelation kinetics via bottle testing. An intermediate formulation including HPAM at 20 kppm combined with an off-stoichiometric ratio of Cr (10:1 of HPAM:$Cr^{+3}$) resulted in the gradual gelation over two days, which enabled rheological monitoring of the crosslinking reaction (see FIG. 9). These studies provide a design space of experimental conditions useful for the following studies with the nanocapsules.

Figure 10:
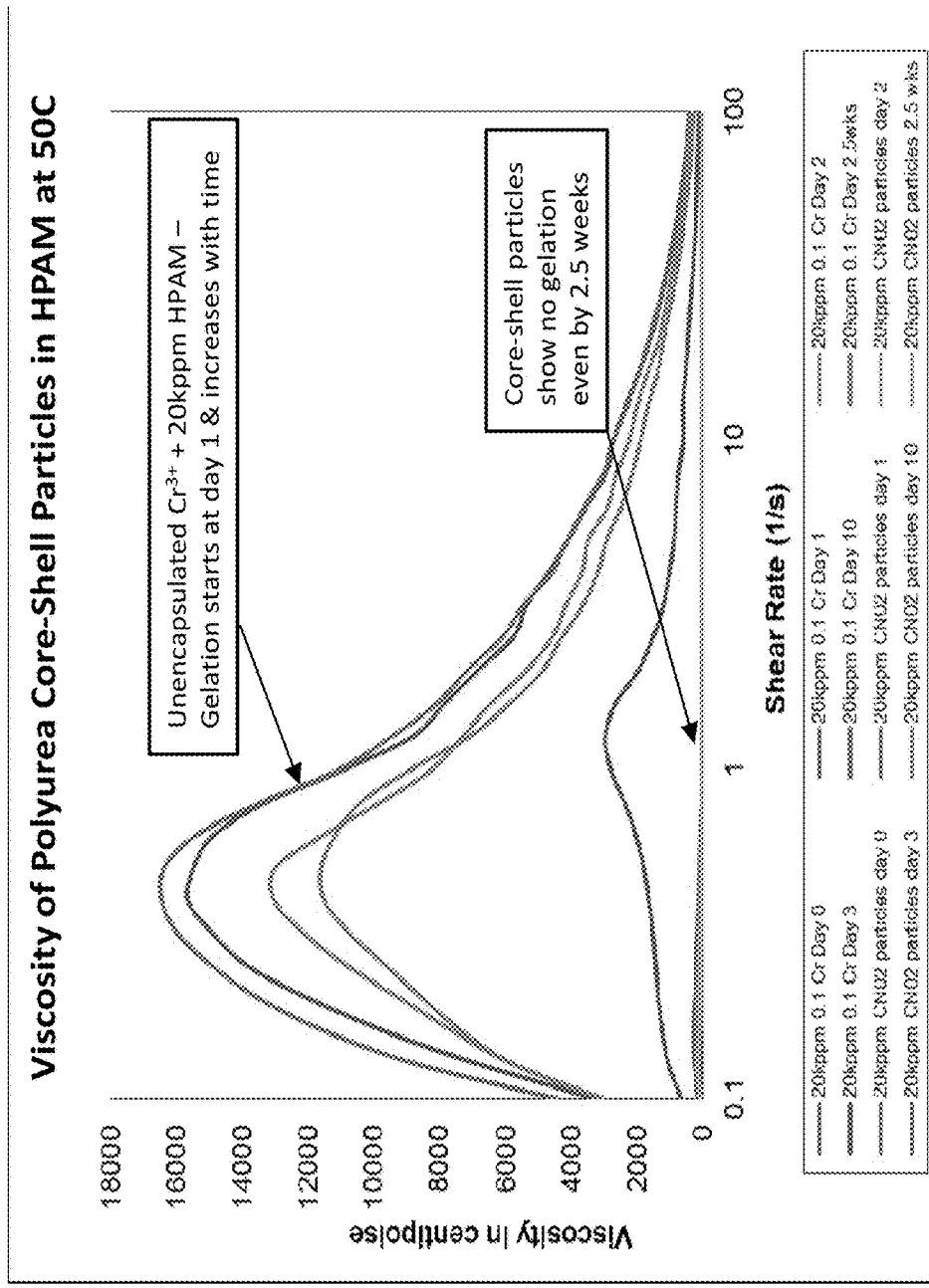
FIG. 10 is a graph of viscosity vs. shear rate for 20 kppm of HPAM in combination with unencapsulated $Cr^{+3}$ and encapsulated $Cr^{+3}$, the HPAM and $Cr^{+3}$ being present at stoichiometric ratios.

The successful utilization of nanocapsules for improved conformance requires not only the encapsulation of $Cr^{+3}$, but also the subsequent release of the cargo to enable delayed gelation with proximal HPAM. In these studies, the core-shell nanocapsules were engineered to contain degradable chemical groups within the polymer shell that respond to thermal stimuli. In particular, wither azo or ester-based degradable groups were used within the shell material. The release kinetics of $Cr^{+3}$ from the nanocapsules can be tailored by changing the quantity of degradable groups within the shell. To evaluate the release of $Cr^{+3}$ from the nanocapsules, rheology studies were performed. Core-shell nanocapsules containing $Cr^{+3}$ were dispersed in an HPAM solution at 50° C. and was monitored over time. After 2.5 weeks, no gelation of HPAM occurred, suggesting that the nanocapsules did not release the cargo. Conversely, when utilizing un-encapsulated $Cr^{+3}$ and HPAM, the system gelled within 2 days (see FIG. 10).

Figure 11A:
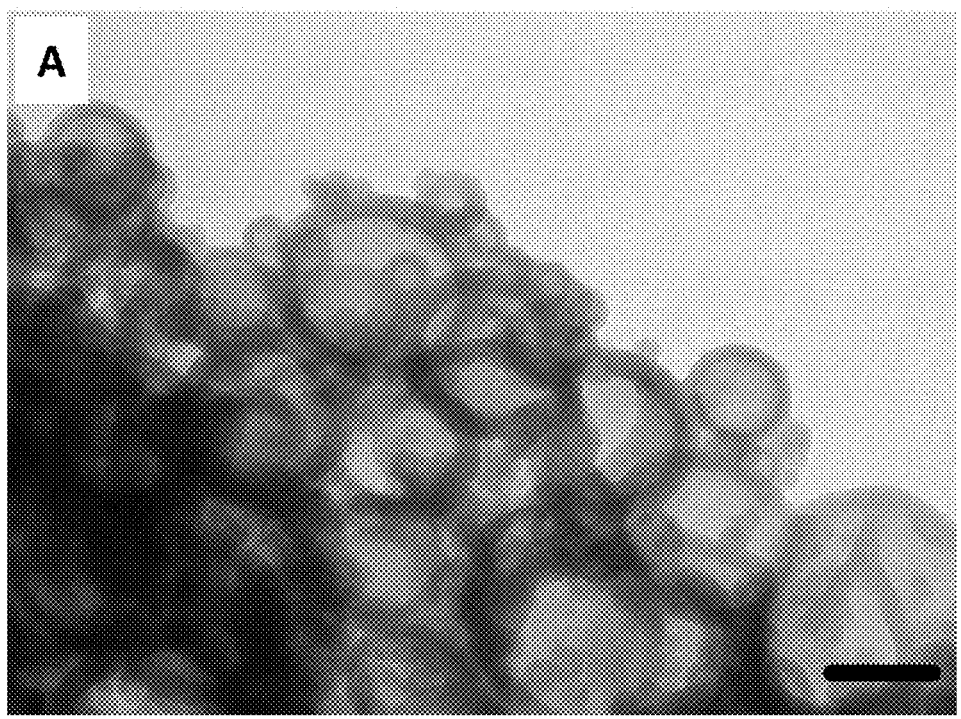
FIG. 11a shows a TEM image of core-shell nanocapsules with polyurea shells and a $Cr^{+3}$ core before exposure to simulated reservoir conditions of 50° C. in brine approximating seawater.
Figure 11B:
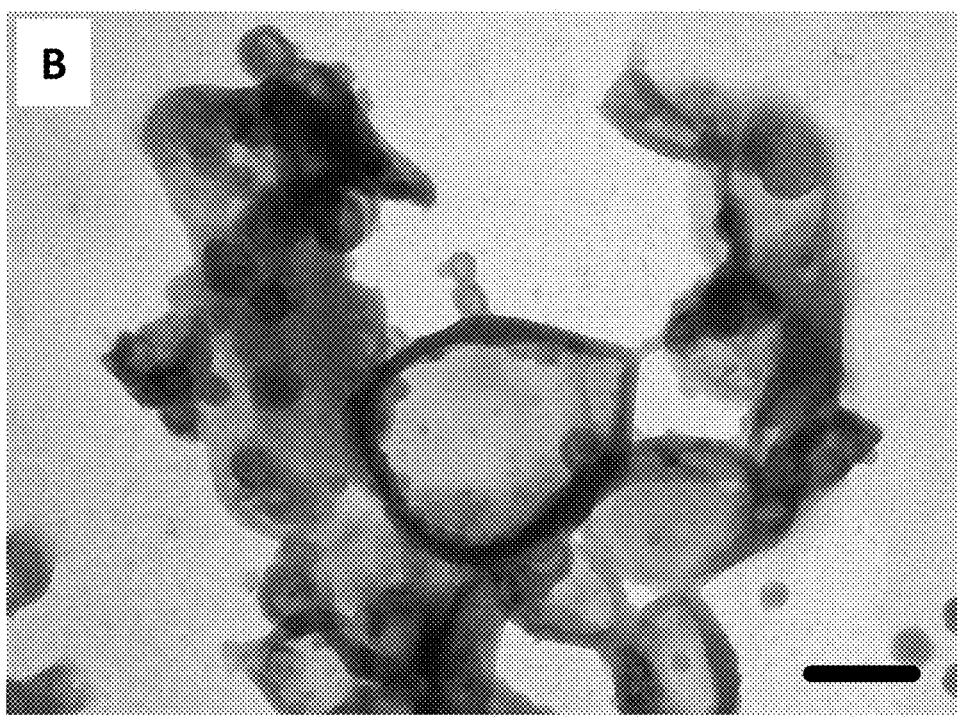
FIG. 11b shows a TEM image of core-shell nanocapsules with polyurea shells and a $Cr^{+3}$ core after exposure to simulated reservoir conditions of 50° C. in brine approximating seawater.

The ability of the $Cr^{+3}$ loaded particles to maintain their structural integrity under simulated reservoir conditions for a short timeframe was evaluated by exposing the particles to 50° C. and high salinity environments for 48 hours. The TEM images show the morphology of the core-shell nanocapsules including the polyurea shells after exposure to these simulated reservoir conditions. The morphology of the particles without $Cr^{+3}$ within the core (FIG. 11a) and with $Cr^{+3}$ in the core (FIG. 11b) both exhibit intact core-shell structures. This data therefore supports that the core-shell nanocapsules are highly stable under these simulated reservoir conditions.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the appended claims.

As used herein with respect to an identified property or circumstance, "substantially" refers to a degree of deviation that is sufficiently small so as to not measurably detract from the identified property or circumstance. The exact degree of deviation allowable may in some cases depend on the specific context.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc. The same principle applies to ranges reciting only one numerical value, such as "less than approximately 4.5," which should be interpreted to include all of the above-recited values and ranges. Further, such an interpretation should apply regardless of the breadth of the range or the characteristic being described.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

All publications and patent applications are herein incorporated by reference to the same extent as if each individual publication or patent application was specifically and individually indicated to be incorporated by reference.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

The invention claimed is:

1. A gelation system comprising:
   a gel-forming polymer configured for crosslinking with a crosslinker; and
   a controlled-release delivery particle comprising a degradable polymeric shell surrounding a core comprising the crosslinker;
   wherein the degradable polymeric shell comprises a polymer selected from the group consisting of polyureas, polyurethanes, and combinations thereof.

2. The gelation system of claim 1, wherein the gel-forming polymer is selected from the group consisting of polyacrylamides, partially hydrolyzed polyacrylamides, polyvinyl alcohols, biopolymers, and combinations thereof.

3. The gelation system of claim 2, wherein the gel-forming polymer comprises a polyacrylamide-co-acrylic acid.

4. The gelation system of claim 1, wherein the gel-forming polymer is in the form of a hydrated solution.

5. The gelation system of claim 4, wherein the hydrated solution, in a non-crosslinked form, has a viscosity that is greater than the viscosity of water but is less than 50 cP at a temperature of about 25 ° C.

6. The gelation system of claim 1, wherein the gel-forming polymer has a weight average molecular weight of about 50,000 Da to about 2,000,000 Da.

7. The gelation system of claim 1, wherein the crosslinker is source of a metal ion.

8. The gelation system of claim 7, wherein the metal ion is selected from the group consisting of Cr(III), Cr(IV), Ti(IV), Al(III), Zr(IV), and combinations thereof.

9. The gelation system of claim 7, wherein the crosslinker is selected from the group consisting of chromium propionate, chromium acetate, chromium chloride, or combinations thereof.

10. The gelation system of claim 1, wherein the degradable polymeric shell is configured for one or more of thermal degradation, oxidative degradation, and chemical degradation for release of the crosslinker from the core.

11. The gelation system of claim 1, wherein the degradable polymeric shell comprises one or more of polymers with hydrolytically cleavable groups that degrade with time, polymers with hydrolytically degradable groups that degrade in aqueous media, polymers with azo cleavable groups, and polymers with thermally degradable azo groups.

12. The gelation system of claim 1, wherein the degradable polymeric shell is configured to release the crosslinker from the core in response to a change in one or more of pH, temperature, pressure, salinity, shear, water content, oil content, and combinations thereof.

13. The gelation system of claim 1, wherein the controlled release delivery particle has an average size of about 50 nm to about 900 nm.

* * * * *